(12) United States Patent
Finn et al.

(10) Patent No.: US 6,496,581 B1
(45) Date of Patent: Dec. 17, 2002

(54) COUPLED ACOUSTIC ECHO CANCELLATION SYSTEM

(75) Inventors: Brian M. Finn, Madison, WI (US); Thomas O. Roe, Stoughton, WI (US)

(73) Assignee: Digisonix, Inc., Middleton, WI (US)

( * ) Notice: Subject to any disclaimer, the term of this patent is extended or adjusted under 35 U.S.C. 154(b) by 0 days.

(21) Appl. No.: 08/927,874

(22) Filed: Sep. 11, 1997

(51) Int. Cl.$^7$ ................................................ H04M 9/08
(52) U.S. Cl. ........................... 379/406.01; 379/406.01; 379/406.02; 379/406.03; 379/406.06; 379/406.08; 379/406.09; 379/406.1; 379/406.16
(58) Field of Search .................. 379/406–411, 388, 379/392, 41, 406.08, 407, 412; 381/71.21, 94, 71, 73, 83, 93, 71.11, 94.7, 71.1–71.9, 66, 107

(56) References Cited

U.S. PATENT DOCUMENTS

| | | | |
|---|---|---|---|
| 4,677,676 A | * 6/1987 | Eriksson | 381/71 |
| 5,022,082 A | 6/1991 | Eriksson et al. | |
| 5,033,082 A | * 7/1991 | Eriksson et al. | 379/406.08 |
| 5,216,722 A | 6/1993 | Popovich | |
| 5,533,120 A | 7/1996 | Staudacher | |
| 5,602,928 A | * 2/1997 | Eriksson et al. | 381/71 |
| 5,633,936 A | 5/1997 | Oh | |
| 6,097,820 A | * 8/2000 | Turner | 381/94.3 |
| 6,141,415 A | * 10/2000 | Rao | 379/410 |

FOREIGN PATENT DOCUMENTS

| | | |
|---|---|---|
| EP | 0 568 129 A | 11/1993 |
| EP | 0 721 178 A | 7/1996 |

OTHER PUBLICATIONS

"DFR11EQ Digital Feedback Reducer and Graphic Equalizer With Software Interface for Windows", Model DFR11EQ User Guide, Shure Brothers Incorporated, 222 Hartrey Avenue, Evanston, IL 60202-3696, 1996.

*Adaptive Signal Processing*, Widrow and Stearns, Prentice-Hall, Inc., Englewood Cliffs, NJ 07632, 1985, pp. 316–323.

*Number Theory In Science And Communication*, M.R. Schroeder, Berlin: Springer-Verlag, 1984, pp. 252–261.

\* cited by examiner

*Primary Examiner*—Forester W. Isen
*Assistant Examiner*—Ramnandan Singh
(74) *Attorney, Agent, or Firm*—Andrus, Sceales, Starke & Sawall, LLP

(57) ABSTRACT

Full acoustic coupling and echo cancellation is provided in implementations where there is acoustic coupling between acoustic zones. In acoustic echo cancellation systems, including active acoustic attenuation systems and communications systems, having a first model canceling the speech of a second person in the output of a first microphone otherwise present due to electrical transmission from a second microphone to a first loudspeaker and broadcast by the first loudspeaker to the first microphone, the cancellation of the speech of the second person in the output of the first microphone preventing rebroadcast thereof by the second loudspeaker, and a second model canceling the speech of the first person in the output of the second microphone otherwise present due to electrical transmission from the first microphone to the second loudspeaker and broadcast by the second loudspeaker to the second microphone, the cancellation of the speech of the first person in the output of the second microphone preventing rebroadcast thereof by the first loudspeaker, an improvement provides a third model cancelling the speech of the first person in the output of the first microphone otherwise present due to acoustic transmission from the second loudspeaker in the second zone to the first microphone in the first zone, and a fourth model cancelling the speech of the second person in the output of the second microphone otherwise due to acoustic transmission from the first loudspeaker in the first zone to the second microphone in the second zone. Further improvements and features are provided in various combinations.

81 Claims, 8 Drawing Sheets

COUPLED ACOUSTIC ECHO CANCELLATION SYSTEM

BACKGROUND AND SUMMARY

The invention relates to acoustic echo cancellation systems, including active acoustic attenuation systems and communication systems. The invention arose during continuing development efforts relating to the subject matter of U.S. Pat. No. 5,033,082, incorporated herein by reference.

In one aspect of the invention, a fully coupled active echo cancellation matrix is provided, canceling echo due to acoustic transmission between zones, in addition to cancellation of echoes due to electrical transmission between zones as in incorporated U.S. Pat. No. 5,033,082. In the latter patent, a communication system is provided including a first acoustic zone, a second acoustic zone, a first microphone at the first zone, a first loudspeaker at the first zone, a second microphone at the second zone and having an output supplied to the first loudspeaker such that a first person at the first zone can hear the speech of a second person at the second zone as transmitted by the second microphone and the first loudspeaker, a second loudspeaker at the second zone and having an input supplied from the first microphone such that the second person at the second zone can hear the speech of the first person at the first zone as transmitted by the first microphone and the second loudspeaker, a first model cancelling the speech of the second person in the output of the first microphone otherwise present due to electrical transmission from the second microphone to the first loudspeaker and broadcast by the first loudspeaker to the first microphone, the cancellation of the speech of the second person in the output of the first microphone preventing rebroadcast thereof by the second loudspeaker, and a second model cancelling the speech of the first person in the output of the second microphone otherwise present due to electrical transmission from the first microphone to the second loudspeaker and broadcast by the second loudspeaker to the second microphone, the cancellation of the speech of the first person in the output of the second microphone preventing rebroadcast thereof by the first loudspeaker. In the present invention, there is provided a third model cancelling the speech of the first person in the output of the first microphone otherwise present due to acoustic transmission from the second loudspeaker in the second zone to the first microphone in the first zone, and a fourth model canceling the speech of the second person in the output of the second microphone otherwise due to acoustic transmission from the first loudspeaker in the first zone to the second microphone in the second zone. The present invention has desirable application in those implementations where there is acoustic coupling between the first and second zones, for example in a vehicle such as a minivan, where the first zone is the front seat and the second zone is a rear seat, and it is desired to provide an intercom communication system, and cancel echoes not only due to local acoustic transmission in a zone but also global acoustic transmission between zones, including in combination with active acoustic attenuation.

In another aspect of the invention, there is provided a switch having open and closed states, and conducting the output of a microphone therethrough in the closed state, a voice activity detector having an input from the output of the microphone at a node between the microphone and the switch, an occupant sensor sensing the presence of a person at the acoustic zone, and a logical AND function having a first input from the voice activity detector, a second input from the occupant sensor, and an output to the switch to actuate the latter between open and closed states. This feature is desirable in automotive applications when there are no additional passengers for a driver to communicate with.

In another aspect of the invention, an input to a model is supplied through a variable training signal circuit providing increasing training signal levels with increasing speech signal levels or increased interior ambient noise levels associated with higher vehicle speeds. This is desirable for on-line training noise to be imperceptible by the occupant yet have a sufficient signal to noise ratio for accurate model convergence.

In another aspect of the invention, a noise responsive high pass filter is provided between a microphone and a remote yet acoustically coupled loudspeaker, and having a filter cutoff effective at elevated noise levels and reducing bandwidth and making more gain available, to improve intelligibility of speech of a person in the zone of the microphone transmitted to the remote loudspeaker. In vehicle applications, the high pass filter is vehicle speed sensitive, such that at higher vehicle speeds and resulting higher noise levels, lower frequency speech content is blocked and higher frequency speech content is passed, the lower frequency speech content being otherwise masked at higher speeds by broadband vehicle and wind noise, so that the reduced bandwidth and the absence of the lower frequency speech content does not sacrifice the perceived quality of speech, and such that at lower vehicle speeds and resulting lower noise levels, the cutoff frequency of the filter is lowered such that lower frequency speech content is passed, in addition to higher frequency speech content, to provide enriched low frequency performance, and overcome objections to a tinny sounding system.

In another aspect, there is provided a feedback detector having an input from a microphone, and an output controlling an adjustable notch filter filtering the output of the microphone supplied to a remote yet acoustically coupled loudspeaker. This overcomes prior objections in closed loop communication systems which can become unstable whenever the total loop gain exceeds unity. Careful setting of system gain and acoustic echo cancellation may be used to ensure system stability. For various reasons, such as high gain requirements, acoustic feedback may occur, which is often at the system resonance or where the free response is relatively undamped. These resonances usually have a very high Q factor and can be represented by a narrow band in the frequency domain. Thus, the total system gain ceiling is determined by a small portion of the communication system bandwidth, in essence limiting performance across all frequencies in the band for one or more narrow regions. The present invention overcomes this objection.

In another aspect of the invention, an acoustic feedback tonal canceler is provided, removing tonal noise from the output of the microphone to prevent broadcast thereof by a remote but acoustically coupled loudspeaker.

Other features and aspects are provided, as will be understood in the following description.

DETAILED DESCRIPTION

Prior Art

Figure 1:
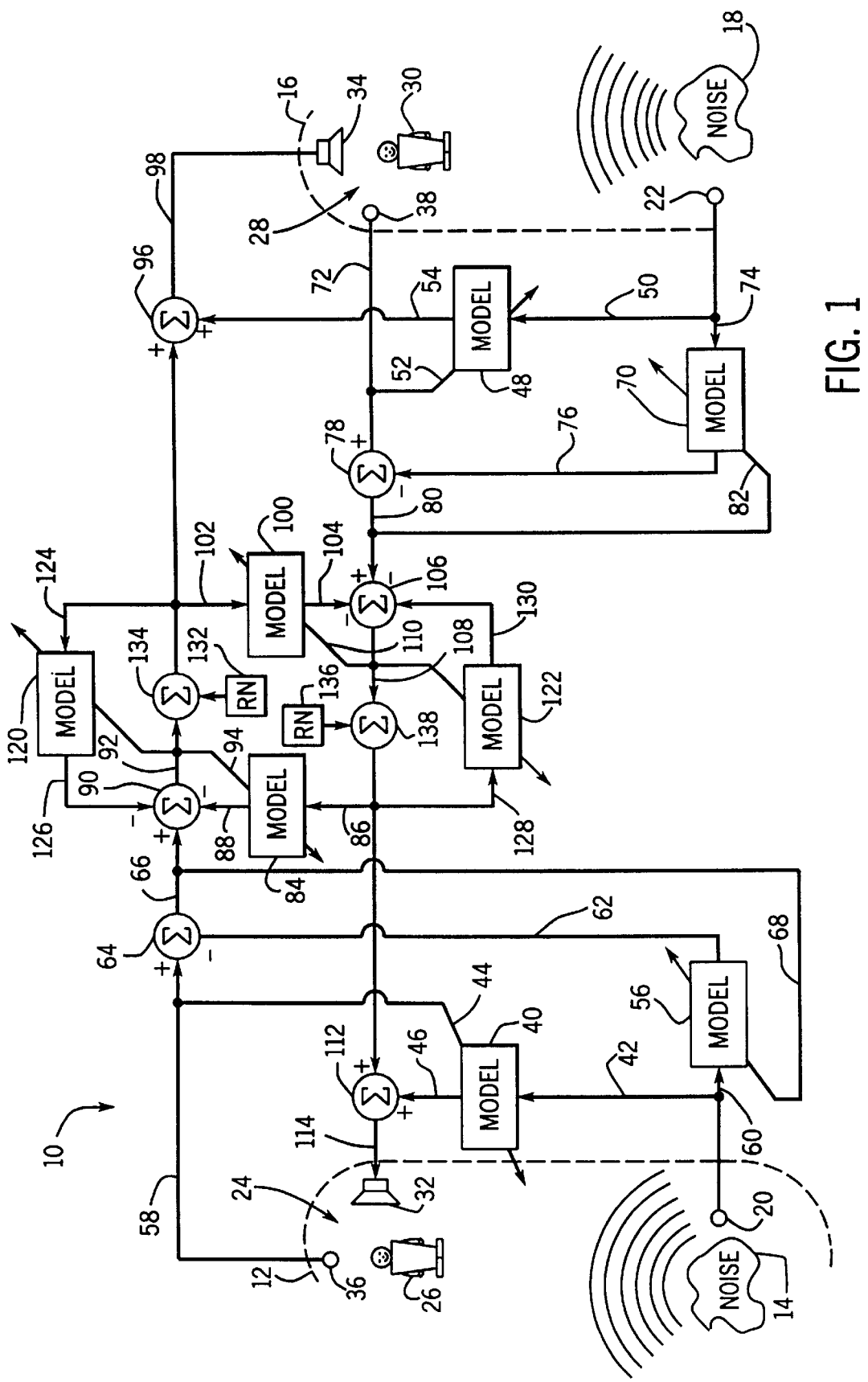
FIG. 1 shows an active acoustic attenuation and communication system in accordance with the invention.

FIG. 1 is similar to the drawing of incorporated U.S. Pat. No. 5,033,082, and uses like reference numerals where appropriate to facilitate understanding. FIG. 1 shows an active acoustic attenuation system 10 having a first zone 12 subject to noise from a noise source 14, and a second zone 16 spaced from zone 12 and subject to noise from a noise source 18. Microphone 20 senses noise from noise source 14. Microphone 22 senses noise from noise source 18. Zone 12 includes a talking location 24 therein such that a person 26 at location 24 is subject to noise from noise source 14. Zone 16 includes a talking location 28 therein such that a person 30 at location 28 is subject to noise from noise source 18. Loudspeaker 32 introduces sound into zone 12 at location 24. Loudspeaker 34 introduces sound into zone 16 at location 28. An error microphone 36 senses noise and speech at location 24. Error microphone 38 senses noise and speech at location 28.

An adaptive filter model 40 adaptively models the acoustic path from noise microphone 20 to talking location 24. Model 40 is preferably that disclosed in U.S. Pat. No. 4,677,676, incorporated herein by reference. Adaptive filter model 40 has a model input 42 from noise microphone 20, an error input 44 from error microphone 36, and outputs at output 46 a correction signal to loudspeaker 32 to introduce cancelling sound at location 24 to cancel noise from noise source 14 at location 24, all as in incorporated U.S. Pat. No. 4,677,676.

An adaptive filter model 48 adaptively models the acoustic path from noise microphone 22 to talking location 28. Model 48 has a model input 50 from noise microphone 22, an error input 52 from error microphone 38, and outputs at output 54 a correction signal to loudspeaker 34 to introduce cancelling sound at location 28 to cancel noise from noise source 18 at location 28.

An adaptive filter model 56 adaptively cancels noise from noise source 14 in the output 58 of error microphone 36. Model 56 has a model input 60 from noise microphone 20, an output correction signal at output 62 subtractively summed at summer 64 with the output 58 of error microphone 36 to provide a sum 66, and an error input 68 from sum 66.

An adaptive filter model 70 adaptively cancels noise from noise source 18 in the output 72 of error microphone 38. Model 70 has a model input 74 from noise microphone 22, an output correction signal at output 76 subtractively summed at summer 78 with the output 72 of error microphone 38 to provide a sum 80, and an error input 82 from sum 80.

An adaptive filter model 84 adaptively cancels speech from person 30 in the output 58 of error microphone 36. Model 84 has a model input 86 from error microphone 38, an output correction signal at output 88 subtractively summed at summer 90 with sum 66 to provide a sum 92, and an error input 94 from sum 92. Sum 92 is additively summed at summer 96 with the output 54 of model 48 to provide a sum 98 which is supplied to loudspeaker 34. Sum 92 is thus supplied to loudspeaker 34 such that person 30 can hear the speech of person 26.

An adaptive filter model 100 adaptively cancels speech from person 26 in the output 72 of error microphone 38. Model 100 has a model input 102 from error microphone 36 at sum 92, an output correction signal at output 104 subtractively summed at summer 106 with sum 80 to provide a sum 108, and an error input 110 from sum 108. Sum 108 is additively summed at summer 112 with the output 46 of model 40 to provide a sum 114 which is supplied to loudspeaker 32. Hence, sum 108 is supplied to loudspeaker 32 such that person 26 can hear the speech of person 30. Model input 86 is provided by sum 108, and model input 102 is provided by sum 92.

Sum 98 supplied to loudspeaker 34 is substantially free of noise from noise source 14 as acoustically and electrically cancelled by adaptive filter models 40 and 56, respectively. Sum 98 is substantially free of speech from person 30 as electrically cancelled by adaptive filter model 84. Hence, sum 98 to loudspeaker 34 is substantially free of noise from noise source 14 and speech from person 30 but does contain speech from person 26, such that loudspeaker 34 cancels noise from noise source 18 at location 28 and introduces substantially no noise from noise source 14 and introduces substantially no speech from person 30 and does introduce speech from person 26, such that person 30 can hear person 26 substantially free of noise from noise sources 14 and 18 and substantially free of his own speech.

Sum 114 supplied to loudspeaker 32 is substantially free of noise from noise source 18 as acoustically and electrically cancelled by adaptive filter models 48 and 70, respectively. Sum 114 is substantially free of speech from person 26 as electrically cancelled by adaptive filter model 100. Sum 114 to loudspeaker 32 is thus substantially free of noise from noise source 18 but does contain speech from person 30, such that loudspeaker 32 cancels noise from noise source 14 at location 24 and introduces substantially no noise from noise source 18 and introduces substantially no speech from person 26 and does introduce speech from person 30, such that person 26 can hear person 30 substantially free of noise from noise sources 14 and 18 and substantially free of his own speech.

Each of the adaptive filter models is preferably that shown in above incorporated U.S. Pat. No. 4,677,676. Each model adaptively models its respective forward path from its respective input to its respective output on-line without dedicated off-line pretraining. Each of models 40 and 48 also adaptively models its respective feedback path from its respective loudspeaker to its respective microphone for both broadband and narrowband noise without dedicated off-line pretraining and without a separate model dedicated solely to the feedback path and pretrained thereto. Each of models 40 and 48, as in above noted incorporated U.S. Pat. No. 4,677,676, adaptively models the feedback path from the respective loudspeaker to the respective microphone as part of the adaptive filter model itself without a separate model dedicated solely to the feedback path and pretrained thereto. Each of models 40 and 48 has a transfer function comprising both zeros and poles to model the forward path and the feedback path, respectively. Each of models 56 and 70 has a transfer function comprising both poles and zeros to adaptively model the pole-zero acoustical transfer function between its respective input microphone and its respective error microphone. Each of models 84 and 100 has a transfer function comprising both poles and zeros to adaptively model the pole-zero acoustical transfer function between its respective output loudspeaker and its respective error microphone. The adaptive filter for all models is preferably accomplished by the use of a recursive least mean square filter, as described in incorporated U.S. Pat. No. 4,677,676. It is also preferred that each of the models 40 and 48 be provided with an auxiliary noise source, such as 140 in incorporated U.S. Pat. No. 4,677,676, introducing auxiliary noise into the respective adaptive filter model which is random and uncorrelated with the noise from the respective noise source to be cancelled.

In one embodiment, noise microphones 20 and 22 are placed at the end of a probe tube in order to avoid placing the microphones directly in a severe environment such as a region of high temperature or high electromagnetic field strength. Alternatively, the signals produced by noise microphones 20 and 22 are obtained from a vibration sensor placed on the respective noise source or obtained from an electrical signal directly associated with the respective noise source, for example a tachometer signal on a machine or a computer generated drive signal on a device such as a magnetic resonance scanner.

In one embodiment, a single noise source 14 and model 40 are provided, with cancellation via loudspeaker 32 and communication from person 26 via microphone 36. In another embodiment, only models 40 and 56 are provided. In another embodiment, only models 40, 56 and 84 are provided.

It is thus seen that communication system 10 includes a first acoustic zone 12, a second acoustic zone 16, a first microphone 36 at the first zone, a first loudspeaker 32 at the first zone, a second microphone 38 at the second zone and having an output supplied to first loudspeaker 32 such that a first person 26 at first zone 12 can hear the speech of a second person 30 at second zone 16 as transmitted by second microphone 38 and first loudspeaker 32, and a second loudspeaker 34 at second zone 16 and having an input supplied from first microphone 36 such that the second person 30 at the second zone 16 can hear the speech of the first person 26 at the first zone 12 as transmitted by first microphone 36 and second loudspeaker 34. Each of the zones is subject to noise. First person 26 at first talking location 24 in first zone 12 and second person 30 at second talking location 28 in second zone 16 are each subject to noise. Loudspeaker 32 introduces sound into first zone 12 at first talking location 24. Loudspeaker 34 introduces sound into second zone 16 at second talking location 28. Error microphone 36 senses noise and speech at location 24. Model 40 has a model input from a reference signal correlated to the noise as provided by input microphone 20 sensing noise from noise source 14. Model 40 has an error input 44 from microphone 36. Model 40 has a model output 46 outputting a correction signal to loudspeaker 32 to introduce canceling sound at location 24 to attenuate noise thereat. Error microphone 38 senses noise and speech at location 28. Model 48 has a model input 50 from a reference signal correlated with the noise as provided by input microphone 22 sensing the noise from noise source 18. Model 48 has an error input 52 from microphone 38. Model 48 has a model output 54 outputting a correction signal to loudspeaker 34 to introduce cancelling sound at location 28 to attenuate noise thereat. Model 56 has a model input 60 from microphone 20, a model output 62 outputting a correction signal summed at summer 64 with the output 58 of microphone 36 to electrically cancel noise from first zone 12 in the output of microphone 36, and an error input 68 from the output 66 of summer 64. Model 70 has a model input 74 from microphone 22, a model output 76 outputting a correction signal summed at summer 78 with the output 72 of microphone 38 to cancel noise from zone 16 in the output of microphone 38, and an error input 82 from the output 80 of summer 78. Model 84 cancels the speech of second person 30 in the output of microphone 36 otherwise present due to electrical transmission from microphone 38 to loudspeaker 32 and broadcast by loudspeaker 32 to microphone 36, the cancellation of the speech of person 30 in the output of microphone 36 preventing rebroadcast thereof by loudspeaker 34. Model 100 cancels the speech of person 26 in the output of microphone 38 otherwise present due to electrical transmission from microphone 36 to loudspeaker 34 and broadcast by loudspeaker 34 to microphone 38, the cancellation of the speech of person 26 in the output of microphone 34 preventing rebroadcast thereof by loudspeaker 32.

The system above described is shown in incorporated U.S. Pat. No. 5,033,082.

Present Invention

In the present invention, additional models 120 and 122 are provided. Model 120 cancels the speech of person 26 in the output of microphone 36 otherwise present due to acoustic transmission from loudspeaker 34 in zone 16 to microphone 36 in zone 12. This is desirable in implementations where there is no acoustic isolation or barrier between zones 12 and 16, for example as in a vehicle such as a minivan where zone 12 may be the front seat and zone 16 a back seat, i.e. where there is acoustic coupling of the zones and acoustic transmission therebetween such that sound broadcast by loudspeaker 34 is not only electrically transmitted via microphone 38 and loudspeaker 32 to zone 12, but is also acoustically transmitted from loudspeaker 34 to zone 12. Model 122 cancels the speech of person 30 in the output of microphone 38 otherwise due to acoustic transmission from loudspeaker 32 in zone 12 to microphone 38 in zone 16.

Model 84 models the path from loudspeaker 32 to microphone 36. Model 100 models the path from loudspeaker 34 to microphone 38. Model 120 models the path from loudspeaker 34 to microphone 36. Model 122 models the path from loudspeaker 32 to microphone 38. Model 84 has a model input 86 from the input to loudspeaker 32 supplied from the output of microphone 38, and a model output 88 to the output of microphone 36 supplied to the input of loudspeaker 34. Model 100 has a model input 102 from the input to loudspeaker 34 supplied from the output of microphone 36, and a model output 104 to the output of microphone 38 supplied to the input of loudspeaker 32. Model 120 has a model input 124 from the input to loudspeaker 34 supplied from the output of microphone 36, and a model output 126 to the output of microphone 36 supplied to the input of loudspeaker 34. Model 122 has a model input 128 from the input to loudspeaker 32 supplied from the output of microphone 38, and a model output 130 to the output of microphone 38 supplied to the input of loudspeaker 32. An auxiliary noise source 132, like auxiliary noise source 140 in incorporated U.S. Pat. No. 4,677,676, introduces auxiliary noise through summer 134 into model inputs 102 and 124 of models 100 and 120, respectively, which auxiliary noise is random and uncorrelated with the noise from the respective noise source to be canceled. In one embodiment, the auxiliary noise source 132 is provided by a Galois sequence, M. R. Schroeder, *Number Theory In Science And*

*Communications*, Berlin: Springer-Verlag, 1984, pages 252–261, though other random uncorrelated noise sources may of course be used. The Galois sequence is a pseudo random sequence that repeats after $2^M-1$ points, where M is the number of stages in a shift register. The Galois sequence is preferred because it is easy to calculate and can easily have a period much longer than the response time of the system. An auxiliary random noise source 136 introduces auxiliary noise through summer 138 into model inputs 86 and 128 of models 84 and 122, respectively, which auxiliary noise is random and uncorrelated with the noise from the respective noise source to be canceled. It is preferred that auxiliary noise source 136 be provided by a Galois sequence, as above described. Each of auxiliary noise sources 132 and 136 is random and uncorrelated relative to each other and relative to noise from noise source 14, speech from person 26, noise from noise source 18, and speech from person 30. Model 120 is trained to converge to and model the path from loudspeaker 34 to microphone 36 by the auxiliary noise from source 132. Model 100 is trained to converge to and model the path from loudspeaker 34 to microphone 38 by the auxiliary noise from source 132. Model 84 is trained to converge to and model the path from loudspeaker 32 to microphone 36 by the auxiliary noise from source 136. Model 122 is trained to converge to and model the path from loudspeaker 32 to microphone 38 by the auxiliary noise from source 136.

Figure 2:
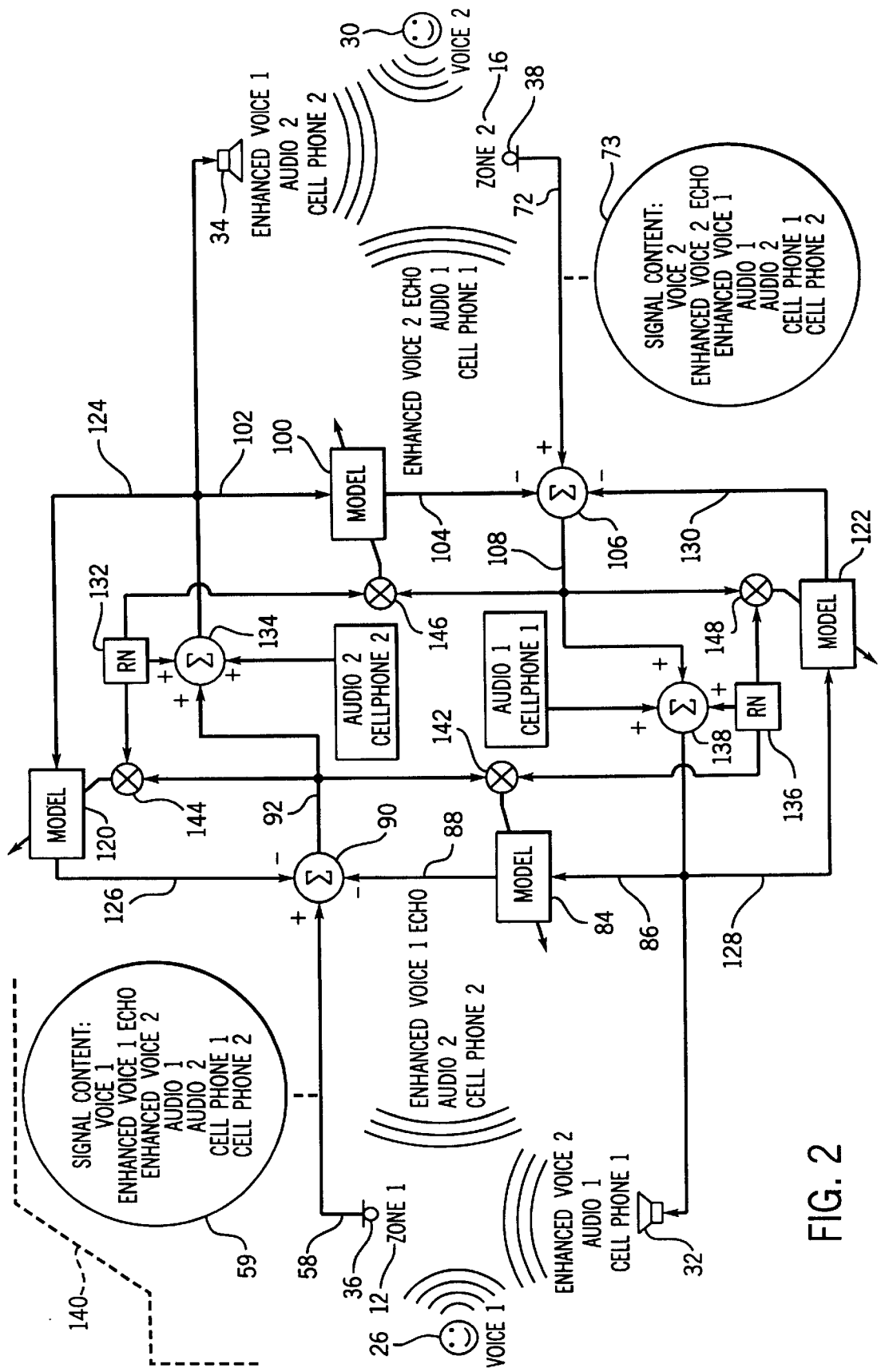
FIG. 2 shows an intercom communication system in accordance with the invention.

FIG. 2 shows a system similar to FIG. 1, and uses like reference numerals where appropriate to facilitate understanding. The system of FIG. 2 is used in a vehicle 140, such as a minivan. Loudspeaker 32 provides enhanced voice from zone 2, i.e. with noise and echo cancellation as above described. Loudspeaker 32 also provides audio for zone 1 and cellular phone for zone 1 at 12 such as the front seat. Also supplied at zone 1 are voice in zone 1 from person 26 such as the driver and/or front seat passenger. Also supplied at zone 1 due to acoustic coupling from zone 2 are the echo of enhanced voice 1 broadcast by speaker 34, with noise and echo cancellation as above described, and audio from zone 2 and cellular phone from zone 2. The signal content in the output 58 of microphone 36 as shown at 59 includes: voice 1; enhanced voice 1 echo; enhanced voice 2; audio 1; audio 2; cell phone 1; cell phone 2. Loudspeaker 34 broadcasts enhanced voice 1, audio for zone 2 and cellular phone for zone 2 at 16 such as a rear seat of the vehicle. Also supplied at zone 2 are voice in zone 2 from person 30, such as one or more rear seat passengers, enhanced voice 2 echo which is the voice from zone 2 as broadcast by speaker 32 in zone 1 due to acoustic coupling therebetween, as well as audio from zone 1 and cell phone from zone 1 as broadcast by speaker 32. The signal content in the output 72 of microphone 38 as shown at 73 includes: voice 2; enhanced voice 2 echo; enhanced voice 1; audio 1; audio 2; cell phone 1; cell phone 2. Summer 90 sums the output 58 of microphone 36, the output 88 of model 84, and the output 126 of model 120, and supplies the resultant sum at 92 to summer 134, error correlator multiplier 142 of model 84, and an error correlator multiplier 144 of model 120. Summer 134 sums the output 92 of summer 90, the training signal from auxiliary random noise source 132, and the audio 2 and cell phone 2 signals for zone 2, and supplies the resultant sum to loudspeaker 34, model input 124 of model 120, and model input 102 of model 100. Summer 106 sums the output 72 of microphone 38, model output 104 of model 100, and model output 130 of model 122, and supplies the resultant sum at 108 to summer 138, error correlator multiplier 146 of model 100, and error correlator multiplier 148 of model 122. Summer 138 sums the output 108 of summer 106, the training signal from auxiliary random noise source 136, and the audio 1 and cell phone 1 signals for zone 1, and supplies the resultant sum to loudspeaker 32, model input 86 of model 84, and model input 128 of model 122. The training signal from auxiliary random noise source 132 is supplied to summer 134 and to error correlator multipliers 146 and 144 of models 100 and 120, respectively. The training signal from auxiliary random noise source 136 is supplied to summer 138 and to error correlator multipliers 142 and 148 of models 84 and 122, respectively.

In digital voice enhancement, DVE, systems, acoustic echo cancelers, AEC, are used to minimize acoustic reflection and echo, prevent acoustic feedback, and remove additional unwanted signals. Acoustic echo cancelers are most often only applied between the immediate zone loudspeaker and microphone, e.g. model 84 modeling the path from loudspeaker 32 to microphone 36. However, in certain applications where the propagation losses or physical damping between communication zones such as 12 and 16 is not sufficient, e.g. a vehicle interior such as a minivan, the acoustic path between these zones may allow significant coupling and cause added system echo, acoustic feedback and signal corruption.

The present invention applies acoustic echo cancelers between all microphones and loudspeakers in the digital voice enhancement system as shown in FIG. 2. This allows signal contributions from the following sources to be removed from the microphone signal so that it includes only the voice signal from the near end talker: the far end voice broadcast from the near end loudspeaker; the near end audio broadcast from the near end loudspeaker; the near end voice broadcast from the far end loudspeaker; the far end audio broadcast from the far end loudspeaker; cellular phone broadcast from near end and far end loudspeakers. By removing these components, the closed loop full duplex communication system is more stable with desired system gains that were not previously possible. In addition, the resulting signal has less extraneous noise which allows enhanced precision in speech processing activities.

Acoustic echo cancellation may require on-line estimation of the acoustic echo path. In vehicle implementations, it is desirable to detect when occupant movement occurs, to as quickly as possible update the acoustic echo cancellation models. In a desirable feature enabled by the present invention, the available supplemental restraint occupant sensor or a seat belt use detector may be monitored. If the sensor indicates a change in occupant location or seat belt use, an occupant movement is assumed, and rapid adaptation occurs to correct the acoustic echo cancellation models and ensure optimal performance of the system.

Further in vehicle implementations, the proper placement of a communication microphone is difficult due to varying sizes of occupants and seat track locations. Less ideal microphone locations result in lower signal to noise ratios, higher required system gain, and lower performance. In a desirable aspect, the present invention enables utilization of supplemental restraint occupant sensors or seat track location sensors, potentially available in future supplemental restraint occupant position detection systems. From such sensors, certain weight, height, fore/aft location information, etc., may be available. The present invention enables use of such information to select the most appropriate microphone, e.g. from a bank of microphones, and/or gain selection to ensure system performance. For example, certain weight or height information would signal a short occupant. From this information, the general seat track position may be presumed or obtained from a seat track location sensor, and a best suited microphone selected. Also, from height information, the distance from the occupant to the selected microphone might be estimated, and an appropriate gain applied to account for extra distance from the selected microphone. The present invention enables utilization of such signals to increase system robustness by selecting appropriate transducers and parameters. This provides microphone selection and/or gain selection by occupant sensor input.

Multidimensional digital voice enhancement systems can be reconfigured during operation to match occupant requirements. Many activities are processor intensive and compromise system robustness when compared with smaller dimensioned systems. In a desirable aspect, the present invention enables utilization of vehicle occupant sensor or seat belt use detector information to determine if an occupant is present in a particular digital voice enhancement zone. If an occupant is not detected, certain functions associated with that zone may be eliminated from the computational activities. Processor ability may be reassigned to other zones to do more elaborate signal processing. The present invention enables the system to reconfigure its dimensionality to perform in an optimum fashion with the requirements placed on it. This provides digital voice enhancement zone hibernation based on occupant sensors.

In digital voice enhancement systems, acoustic echo cancelers are used to minimize echo, stabilize closed loop communication channels, and prevent acoustic feedback, as above noted. The acoustic echo cancelers model the acoustic path between each loudspeaker and each microphone associated with the system. This full coupling of all the loudspeakers and microphones may be computationally expensive and objectionable in certain applications. In a desirable aspect, the present invention allows acoustic echo cancelers to be applied to loudspeaker-microphone acoustic paths when limited processor capabilities exist. Transfer functions are taken between each loudspeaker-microphone combination. The gain over the communication system bandwidth is compared between transfer functions. Those transfer functions exhibiting a higher gain trend over the frequency band indicate greater acoustic coupling between the particular loudspeaker and microphone. The system designer may use a gain trend ranking to apply acoustic echo cancelers first to those paths with the greater acoustic coupling. This allows the system designer to prioritize applying acoustic echo cancelers to the loudspeaker-microphone paths which most need assistance to ensure stable communication. Paths that cannot be serviced with acoustic echo cancelers would rely on the physical damping and propagation losses of the acoustic path for echo reduction, or other less intensive electronic means for increased stability. This enables digital voice enhancement optimization using physical characteristics.

A voice activity detection algorithm is judged by how accurately it responds to a wide variety of acoustic events. One that provides a 100% hit rate on desired voice signals and a 0% falsing rate on unwanted noises is considered ideal. Use of an occupant sensing device as one of the inputs to the voice activity detection algorithm can provide certainty, within limits of the occupant sensing device, that no falsing will occur when a location is not occupied. This feature would be especially relevant to automotive applications when there are no additional passengers for a driver to communicate with. Smart airbags and other passive safety devices may soon be required to know attributes such as the size, shape, and presence of passengers in vehicles for proper deployment. The minimum desired information to be known at the time of deployment would be to know if there is a passenger to be protected. No passenger, or possibly more important, a small passenger or child seat would require disarming of the passive restraint system. This sensing information would be useful as a compounding condition in digital voice enhancement systems to also deactivate a voice sensing microphone when no occupant is present. This provides voice activity detection with occupant sensing devices.

Figure 3:
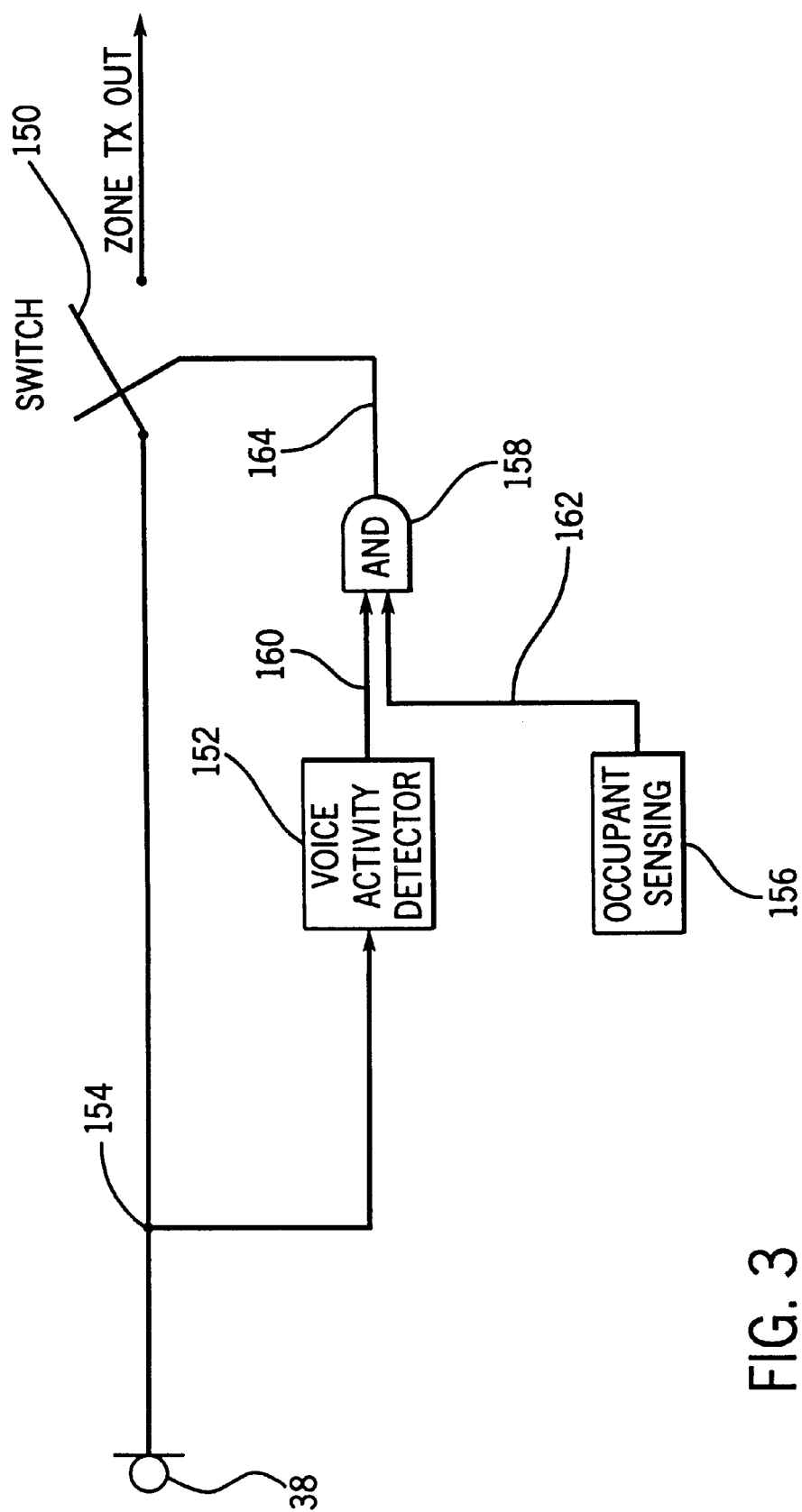
FIG. 3 shows a portion of a communication system in accordance with the invention.

FIG. 3 shows a switch 150 having open and closed states, and conducting the output of microphone 38 therethrough in the closed state. A voice activity detector 152 has an input from the output of microphone 38 at a node 154 between microphone 38 and switch 150. An occupant sensor 156 senses the presence of a person at acoustic zone 16, for example a rear passenger seat. A logic AND function provided by AND gate 158 has a first input 160 from voice activity detector 152, a second input 162 from occupant sensor 156, and an output 164 to switch 150 to actuate the latter between the open and closed states, to control whether the latter passes a zone transmit out signal or not.

It is desirable for on-line training noise to be imperceptible by the occupant, yet have sufficient signal to noise ratio for accurate model convergence. In a desirable aspect, the present system may be used to exploit microphone gate activity to increase the allowable training signal and acoustic echo cancellation convergence. This allows the acoustic echo cancellation models to be more aggressively and accurately adapted. When the microphone gate is opened, some level of speech will be present. When speech is transmitted, a higher level training signal may be added to the speech signal and still be imperceptible to the occupant. This can be accomplished by a gate controlled training signal gain, FIG. 4. The present invention enables utilization of pre-existing system features to increase overall robustness in an unobtrusive fashion. This provides acoustic echo cancellation training noise level based on microphone gate activity.

Figure 4:
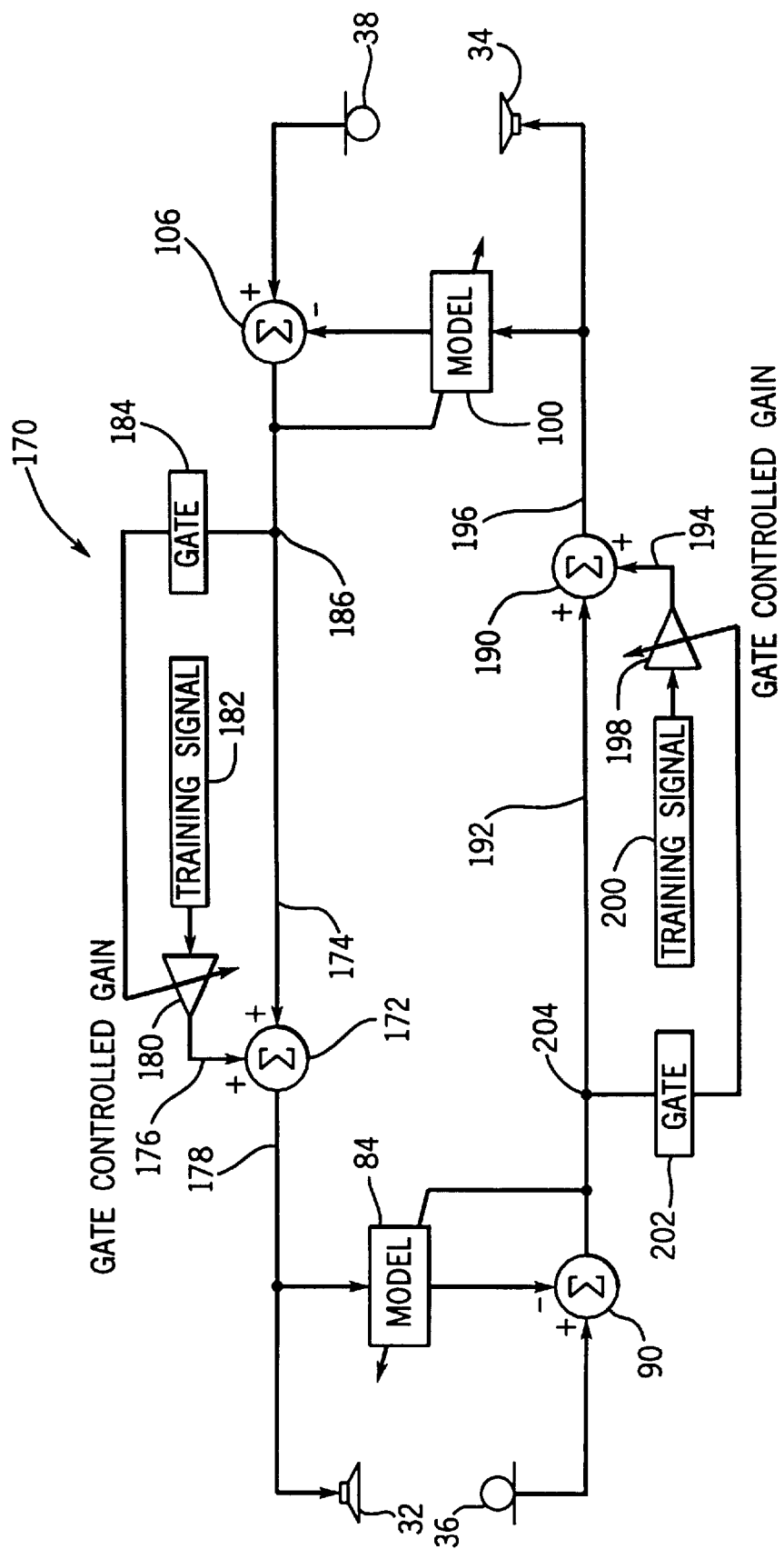
FIG. 4 shows a communication system in accordance with the invention.

In FIG. 4, the input to model 84 is supplied through a variable training signal circuit 170 providing increased training signal level with increasing speech signal levels from microphone 38. Training signal circuit 170 includes a summer 172 having an input 174 from microphone 38, an input 176 from a training signal, and an output 178 to loudspeaker 32 and to model 84. A variable gain element 180 supplies the training signal from training signal source 182 to input 176 of summer 172. A voice activity detector gate 184 senses the speech signal level from microphone 38 at a node 186 between microphone 38 and input 174 of summer 172, and controls the gain of variable gain element 180. As noted above, it is desired that the training signal levels be maintained below a level perceptible to a person at zone 12.

Further in FIG. 4, the input to model 100 is supplied through variable training signal circuit 188 providing increasing training signal levels with increasing speech signal levels from microphone 36. Training signal circuit 188 includes a summer 190 having an input 192 from microphone 36, an input 194 from a training signal, and an output 196 to loudspeaker 34 and to model 100. Variable gain element 198 supplies the training signal from training signal source 200 to input 194 of summer 190. Voice activity detector gate 202 senses the speech signal level from microphone 36 at node 204 between microphone 36 and input 192 of summer 190, and controls the gain of variable gain element 198. It is preferred that the training signal level be maintained below a level perceptible to a person at zone 16.

It is desirable to detect when occupant movement or luggage loading changes occur. In one implementation of the present invention, the vehicle door ajar or courtesy light signal may be monitored. If any door is opened, all on-line modeling is halted. This prohibits the models from adapting to both changes in the acoustic boundary characteristics due to open doors, and also to changes in loudspeaker location when mounted to the moving door. After the doors are determined to be shut, and a system settling time has passed, it can be assumed that an occupant movement or luggage loading change is likely to have occurred. Accordingly, adaptation can occur to correct the acoustic echo cancellation models and ensure optimal performance of the system. Alternatively, an echo return loss enhancement measurement can be made on each model to calculate the echo reduction offered by each acoustic echo cancellation and to determine if they are adequate. If it is determined that they are deficient, an aggressive adaptation could then correct the acoustic echo cancellation models. Again, the system enables the utilization of available signals to ensure system stability and robustness not only by not adapting while the physical system is in a nonfunctional condition but also by modeling when the system is returned to a functional condition to account for possible occupant or luggage movements.

Digital voice enhancement systems may pickup and rebroadcast engine related noise in vehicle applications or other applications involving periodic or tonal noise. This becomes particularly annoying when one of the communication zones has much lower engine related noise than others. In this situation, the rebroadcast noise is not masked by the primary engine related noise. In a desirable aspect of the present system, the engine or engine related tach signal may be conditioned with DC blocking and magnitude clipping to meet proper A/D limitations. A rising edge or zero crossing detector monitors the input signal and calculates a scaler frequency value. An average magnitude detector also monitors the input signal to shut down the frequency detection routine if the average magnitude drops below a specified level. This is a noise rejection scheme for signals with varying amplitude depending on engine speed, revolutions per minute, RPM. The calculated frequency is then converted to the engine related frequencies of interest which are summed and input to an electronic noise control, ENC, filter reference, to be described. The output of the filter is then subtracted from the microphone signal to remove the engine related component from the signal.

Figure 5:
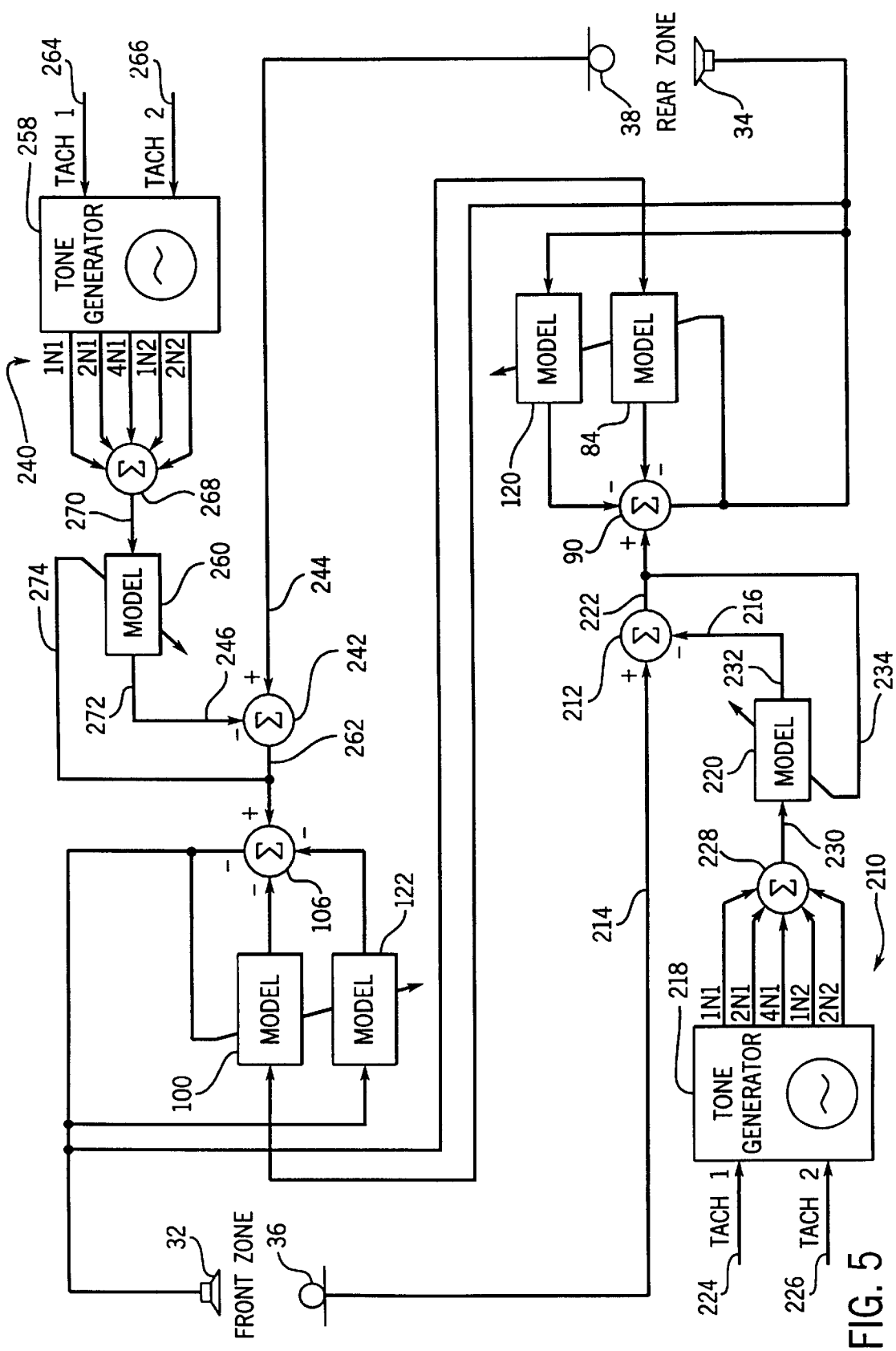
FIG. 5 shows a communication system in accordance with the invention.

In FIG. 5, a tonal noise remover 210 senses periodic noise and removes same from the output of microphone 36 to prevent broadcast thereof by loudspeaker 34. Tonal noise remover 210 includes a summer 212 having an input 214 from microphone 36, an input 216 from a tone generator 218 generating one or more tones in response to periodic noise and supplying same through adaptive filter model 220, and an output 222 to loudspeaker 34 through summer 90. Tone generator 218 receives a plurality of tach signals 224, 226, and outputs a plurality of tone signals to summer 228 for each of the tach signals, for example a tone signal 1N1 which is the same frequency as tach signal 1, a tone signal 2N1 which is twice the frequency of tach signal 1, a tone signal 4N1 which is four times the frequency of tach signal 1, a tone signal 1N2 which is the same frequency as tach signal 2, a tone signal 2N2 which is twice the frequency of tach signal 2, etc. Model 220 has a model input 230 from summer 228, a model output 232 outputting a correction signal to summer input 216, and an error input 234 from summer output 222.

Further in FIG. 5, a second tonal noise remover 240 senses periodic noise and removes same from the output of microphone 38 to prevent broadcast thereof by loudspeaker 32. Tonal noise remover 240 includes summer 242 having an input 254 from microphone 38, an input 246 from a tone generator 248 generating one more tones in response to periodic noise and supplying same through adaptive filter model 260, and an output 262 to loudspeaker 32 through summer 106. Tone generator 258 receives a plurality of tach signals such as 264 and 266, and outputs a plurality of tone signals to summer 268, one for each of the tach signals, as above described for tone generator 218 and tach signals 224 and 226. Model 260 has a model input 270 from summer 268, a model output 272 outputting a correction signal to summer input 246, and an error input 274 from summer output 262. In the noted vehicle implementation, tach 1 signals 224 and 264 are the same, and tach 2 signals 226 and 266 are the same.

In vehicle implementations, background ambient noise increases with vehicle speed, and as a result more gain is needed in a communication system to sustain adequate speech intelligibility. In a desirable aspect, the present system enables application of a noise responsive, including vehicle speed sensitive, high pass filter to the microphone signal. The filter cutoff would increase with elevated noise levels, such as elevated vehicle speeds, and therefor reduce the system bandwidth. By limiting system bandwidth, more gain is available, resulting in improved speech intelligibility. At higher speeds, the lower frequency speech content is masked by broadband vehicle and wind noise, so that the reduced bandwidth does not sacrifice the perceived quality of speech. At low speeds, the high pass filter lowers its cutoff frequency, to provide enriched low frequency performance, thus overcoming objections to a tinny sounding digital voice enhancement system. This provides noise responsive, including speed dependent, band limiting for a communication system.

Figure 6:
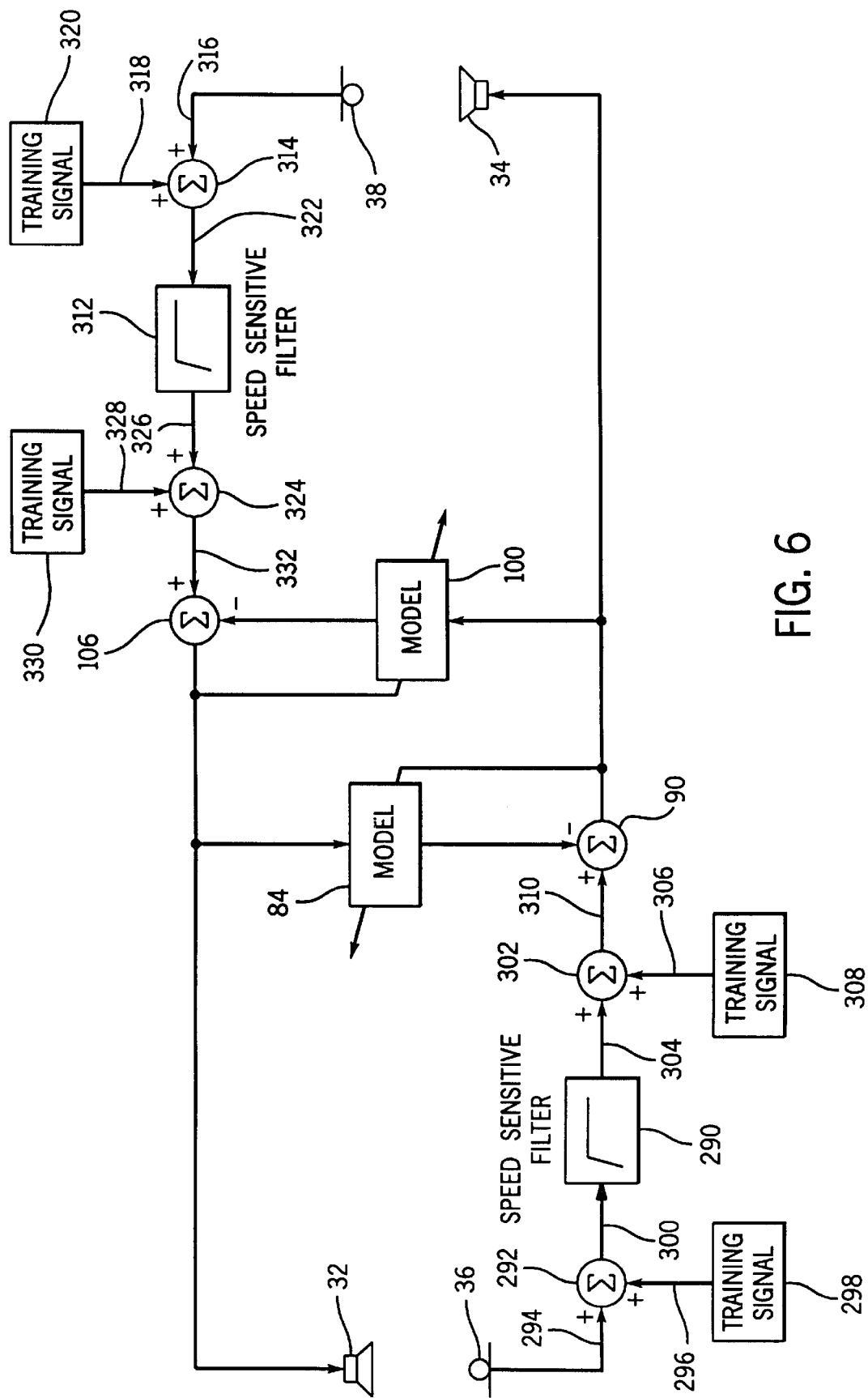
FIG. 6 shows a communication system in accordance with the invention.

The adaptation of the acoustic echo cancellation models with random noise may be accomplished by injecting the training noise before or after the noise responsive or speed sensitive filter, FIG. 6. Injection before such filter provides a system wherein the training noise is speed varying filtered. This approach is advantageous in obtaining the highest training signal allowed while being imperceptible to the occupant. However, the acoustic echo cancellation filters would have potentially unconstrained frequency components. Injection after the speed sensitive filter provides a system wherein the training noise would always be full bandwidth. This has the potential of being more robust, yet has the limitation of lower training noise levels allowed to be imperceptible to the occupant. In a desirable aspect, the present system utilizes the natural trade-offs between bandwidth and gain, and results in a more robust communication system.

In FIG. 6, a noise responsive high pass filter 290 between microphone 36 and loudspeaker 34 has a filter cutoff effective at elevated noise levels and reducing bandwidth and making more gain available, to improve intelligibility of speech of person 26 transmitted from microphone 36 to loudspeaker 34. In the noted vehicle application, high pass filter 290 is vehicle speed sensitive, such that at higher vehicle speeds and resulting higher noise levels, lower frequency speech content is blocked, and higher frequency speech content is passed, the lower frequency speech content being otherwise masked at higher speeds by broadband vehicle and wind noise, so that the reduced bandwidth and the absence of the lower frequency speech content does not sacrifice the perceived quality of speech, and such that at lower vehicle speeds and resulting lower noise levels, the cutoff frequency of the filter is lowered such that lower frequency speech content is passed, in addition to higher frequency speech content, to provide enriched low frequency performance, and overcome objections to a tinny sounding system. In one embodiment, a summer 292 has a first input 294 from microphone 36, a second input 296 from a training signal supplied by training signal source 298, and an output 300 to high pass filter 290, such that the training signal is variably filtered according to noise level, namely vehicle speed in vehicle implementations. In an alternate embodiment, training signal source 298 is deleted, and a summer 302 is provided having an input 304 from high pass filter 290, an input 306 from a training signal supplied by training signal source 308, and an output 310 to loudspeaker 34. In this embodiment, the training signal is full bandwidth and not variably filtered according to noise level or vehicle speed.

Further in FIG. 6, a noise responsive high pass filter 312 between microphone 38 and loudspeaker 32 has a filter cutoff effective at elevated noise levels and reducing bandwidth and making more gain available, to improve intelligibility of speech of person 30 transmitted from microphone 38 to loudspeaker 32. In the noted vehicle application, high pass filter 312 is vehicle speed sensitive, such that at higher vehicle speeds and resulting high noise levels, lower frequency speech content is blocked and higher frequency speech content is passed, the lower frequency speech content being otherwise masked at higher speeds by broadband vehicle and wind noise, so that the reduced bandwidth and the absence of the lower frequency speech content does not sacrifice the perceived quality of speech, and such that at lower vehicle speeds and resulting lower noise levels, the cutoff frequency of the filter is lowered such that lower frequency speech content is passed, in addition to higher frequency speech content, to provide enriched low frequency performance, and overcome objections to a tinny sounding system. In one embodiment, a summer 314 has a first input 316 from microphone 38, a second input 318 from a training signal supplied by training signal source 320, and an output 322 to high pass filter 312, such that the training signal is variably filtered according to noise level, namely vehicle speed in vehicle implementations. In an alternate embodiment, training signal source 320 is deleted, and a summer 324 is provided having an input 326 from high pass filter 312, an input 328 from a training signal supplied by training signal source 330, and an output 332 to loudspeaker 32. In this embodiment, the training signal is full bandwidth and not variably filtered according to noise level or vehicle speed.

Optimal voice pickup in a digital voice enhancement system can be characterized by having the largest talking zone and the highest signal to noise ratio. The larger the talking zone the less sensitivity the digital voice enhancement system will have to the talkers physical size, seating position, and head position/movement. Large talking zones are attributed with good system performance and ergonomics. High signal to noise ratios are associated with speech intelligibility and good sound quality. These two design goals are not always complementary. Large talking zones may be accomplished by having multiple microphones to span the talking zone, however this may have a negative impact on the signal to noise ratio. It is desired that the available set of microphones be scanned to determine the best candidate for maximum speech reception. This may be based on short term averages of power or magnitude. An average magnitude estimation and subsequent comparison from two microphones is one implementation in a digital voice enhancement system.

As above noted, closed loop communication systems can become unstable whenever the total loop gain exceeds unity. Careful setting of the system gain, and acoustic echo cancellation may be used to ensure system stability. For various reasons such as high gain requirements, or less than ideal acoustic echo cancellation performance, acoustic feedback can occur. Acoustic feedback often occurs at a system resonance or where the free response is relatively undamped. These resonances usually occur at a very high Q, quality factor, and can be represented by a narrow band in the frequency domain. Therefore, the total system gain ceiling is determined by only a small portion of the communication system bandwidth, in essence limiting performance across all frequencies in the band for one or more narrow regions. In a desirable aspect, the present invention enables observation, measurement and treatment of persistent high Q system dynamics. These dynamics may relate to acoustic instabilities to be minimized. The observation of acoustic feedback can be performed in the frequency domain. The nature and sound of acoustic feedback is commonly observed in a screeching or howling burst of energy. The sound quality of this type of instability is beyond reverberation, echoes, or ringing, and is observable in the frequency domain by monitoring the power spectrum. Measurement of such a disturbance can be accomplished with a feedback detector, where the exact frequency and magnitude of the feedback can be quantified. Time domain based schemes such as auto correlation could alternatively be applied to obtain similar measurements. Observation and measurement steps could be performed as a background task reducing real time digital signal processing requirements. Treatment follows by converting this feedback frequency information into notch filter coefficients that are implemented by a filter applied to the communication channel. The magnitude of the reduction, or depth of the notch filter's null, can be progressively applied or set to maximum attenuation as desired. Once the filter has been applied, the observation of the acoustic feedback should vanish, however hysteresis in the measurement process should be applied to not encourage cycling of the feedback reduction. Long term statistics of the feedback treatment process can be utilized for determining if the notch filter could be removed from the communication channel. Additionally, multiple notch filters may be connected in series to eliminate more complicated acoustic feedback situations often encountered in three dimensional sound fields.

Figure 7:
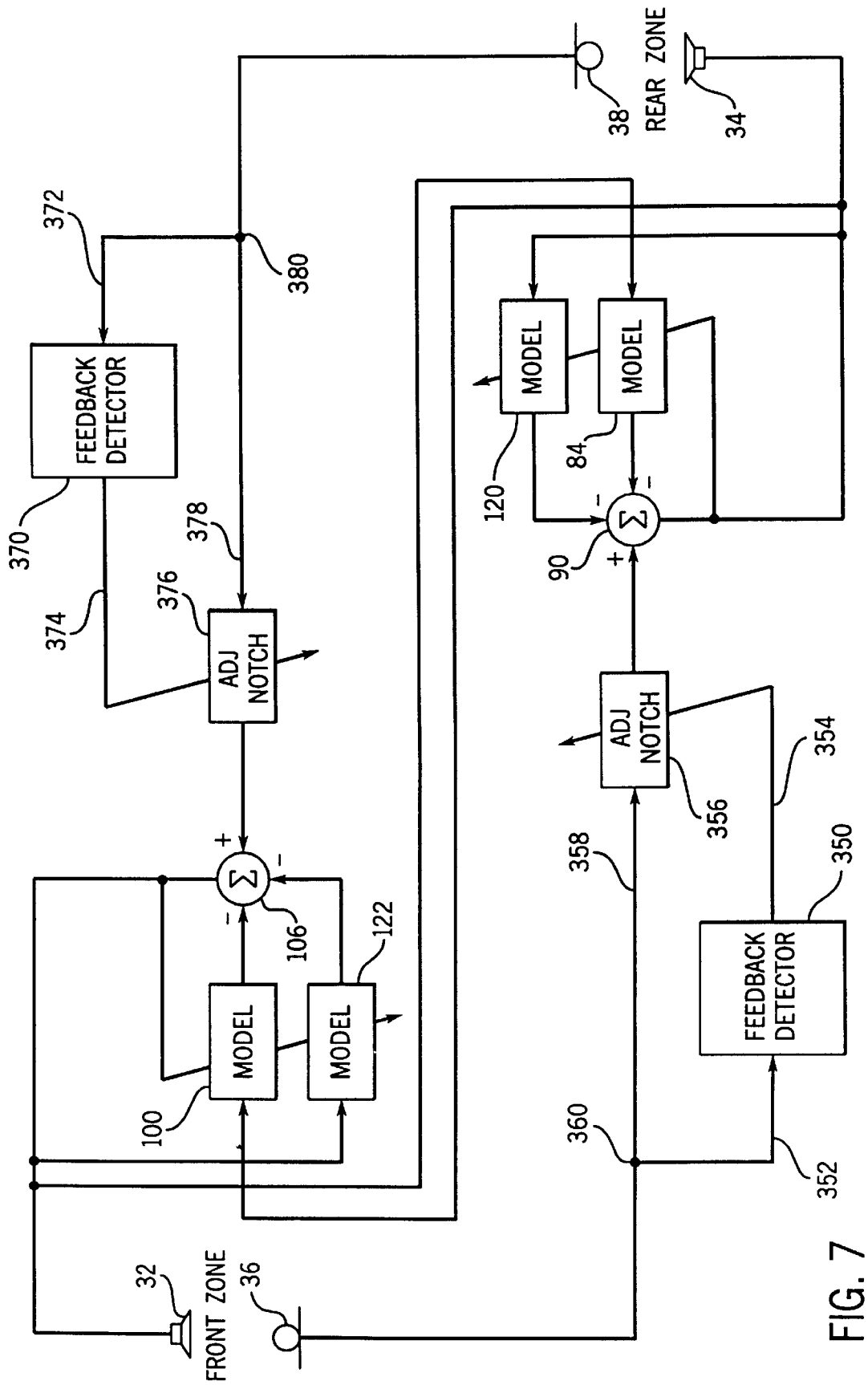
FIG. 7 shows a communication system in accordance with the invention.

In FIG. 7, feedback detector 350 has an input 352 from microphone 36, and an output 354 controlling an adjustable notch filter 356 filtering the output of microphone 36 supplied to loudspeaker 34. Adjustable notch filter 356 has an input 358 from the output of microphone 36. Feedback detector 350 has an input 352 from microphone 36 at a node 360 between the output of microphone 36 and the input 358 of adjustable notch filter 356. Summer 90 has an input from the output of model 84, an input from the output of model 120, and an input from the output of adjustable notch filter 356, and an output supplied to loudspeaker 34. A second feedback detector 370 has an input 372 from microphone 38, and an output 374 controlling a second adjustable notch filter 376 filtering the output of microphone 38 supplied to loudspeaker 32. Adjustable notch filter 376 has an input 378 from microphone 38 at a node 380 between the output of microphone 38 and the input 378 of adjustable notch filter 376. Summer 106 has an input from the output of model 100, an input from the output of model 122, and an input from the output of adjustable notch filter 376. Summer 106 has an output supplied to loudspeaker 32.

In a further aspect, a sine wave or multiple sine waves can be generated from the detected feedback frequency and serve as the reference to the electronic noise control filter. The ENC filter will form notches at the exact frequencies, and adjust its attenuation until the offending feedback tones are minimized to the level of the noise floor. The ENC filter is similar to a classical adaptive interference canceler application as discussed in *Adaptive Signal Processing,* Widrow and Stearns, Prentice-Hall, Inc., Englewood Cliffs, N.J. 07632, 1985, pages 316–323. The output of the filter is then subtracted from the microphone signal to remove the feedback component from the signal. The feedback suppression is performed before the acoustic echo cancellation.

Figure 8:
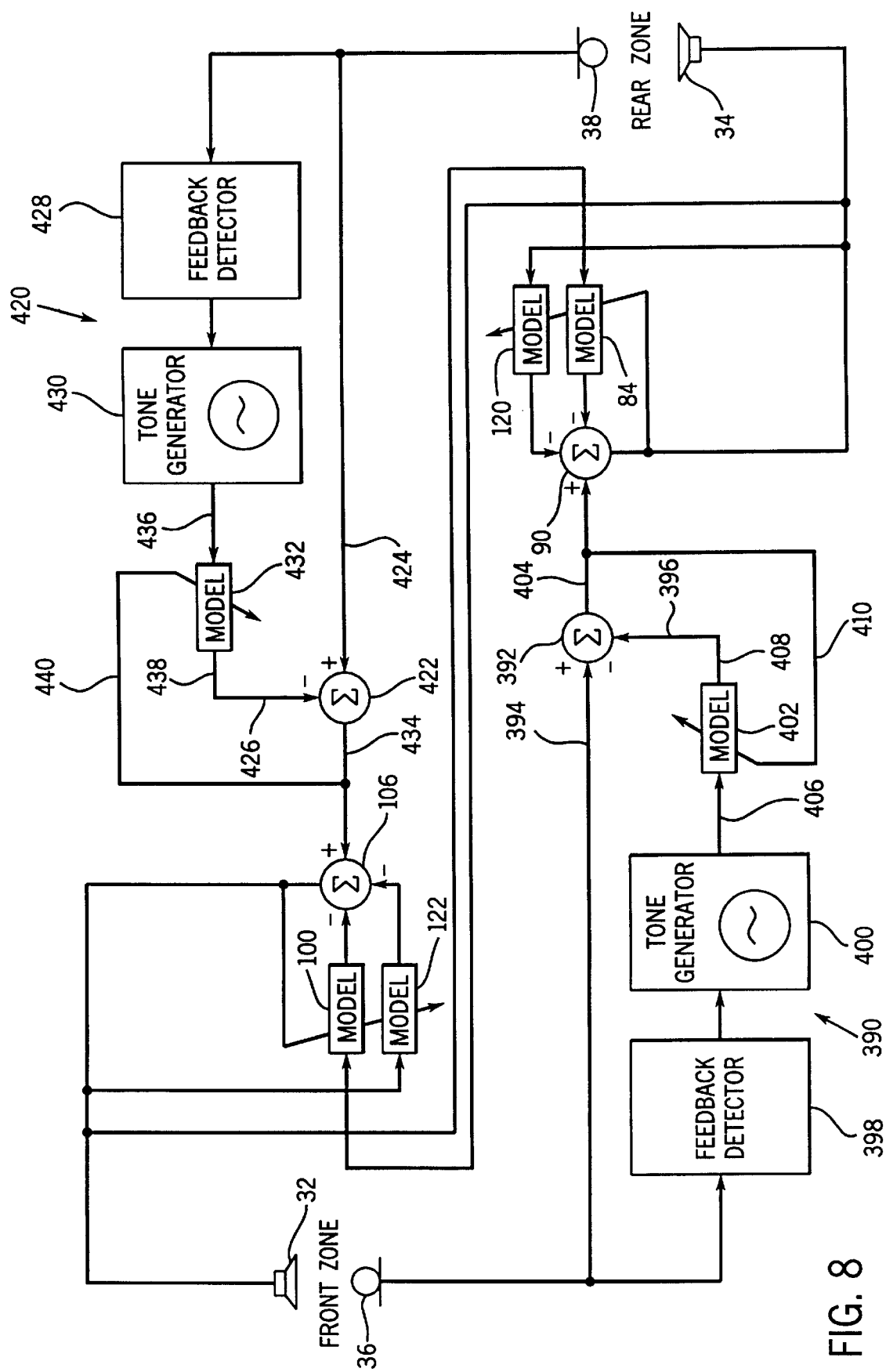
FIG. 8 shows a communication system in accordance with the invention.

In FIG. 8, an acoustic feedback tonal canceler 390 removes tonal feedback noise from the output of microphone 36 to prevent broadcast thereof by loudspeaker 34. Feedback tonal canceler 390 includes a summer 392 having an input 394 from microphone 36, an input 396 from feedback detector 398 and tone generator 400 supplied through adaptive filter model 402, and an output 404 to loudspeaker 34 through summer 90. Model 402 has a model input 406 from tone generator 400, a model output 408 supplying a correction signal to summer input 396, and an error input 410 from summer output 404. A second feedback tonal canceler 420 is comparable to feedback tonal canceler 390. Feedback tonal canceler 420 includes a summer 422 having an input 424 from microphone 38, an input 426 from feedback detector 428 and tone generator 430 supplied through adaptive filter model 432, and an output 434 supplied to loudspeaker 32 through summer 106. Model 432 has a model input 436 from tone generator 430, a model output 438 supplying a correction signal to summer input 426, and an error input 440 from summer output 434.

It is desirable for communication systems to be usable as soon as possible after activated. However, this cannot take place until the acoustic echo cancellation models have converged to an accurate solution so that the system may be used with appropriate gain. In a desirable aspect, in the present system the acoustic echo cancellation models may be stored in memory and used immediately upon system start up. These models may need some minor correction to account for changes in occupant position, luggage loading, and temperature. These model corrections may be accomplished with quicker adaptation from the stored models rather than starting from null vectors, for example in accordance with U.S. Pat. No. 5,022,082, incorporated herein by reference.

Various equivalents, alternatives and modifications may be apparent to those skilled in the art as within the scope of the appended claims.

What is claimed is:

1. In a communication system comprising:
    a first acoustic zone;
    a second acoustic zone;
    a first microphone at said first zone;
    a first loudspeaker at said first zone;
    a second microphone at said second zone and having an output supplied to said first loudspeaker such that a first person at said first zone can hear the speech of a second person at said second zone as transmitted by said second microphone and said first loudspeaker;
    a second loudspeaker at said second zone and having an input supplied from said first microphone such that said second person at said second zone can hear the speech of said first person at said first zone as transmitted by said first microphone and said second loudspeaker;
    a first model canceling the speech of said second person in the output of said first microphone otherwise present due to electrical transmission from said second microphone to said first loudspeaker and broadcast by said first loudspeaker to said first microphone, the cancellation of the speech of said second person in the output of said first microphone preventing rebroadcast thereof by said second loudspeaker;
    a second model canceling the speech of said first person in the output of said second microphone otherwise present due to electrical transmission from said first microphone to said second loudspeaker and broadcast by said second loudspeaker to said second microphone, the cancellation of the speech of said first person in the output of said second microphone preventing rebroadcast thereof by said first loudspeaker;
    the improvement comprising:
    a third model canceling the speech of said first person in the output of said first microphone otherwise present due to acoustic transmission from said second loudspeaker in said second zone to said first microphone in said first zone;
    a fourth model canceling the speech of said second person in the output of said second microphone otherwise due to acoustic transmission from said first loudspeaker in said first zone to said second microphone in said second zone.

2. The invention according to claim 1 wherein:
    said first model models the path from said first loudspeaker to said first microphone;
    said second model models the path from said second loudspeaker to said second microphone;
    said third model models the path from said second loudspeaker to said first microphone;
    said fourth model models the path from said first loudspeaker to said second microphone.

3. The invention according to claim 2 wherein:
    said first model has a model input from the input to said first loudspeaker from the output of said second microphone, and a model output to the output of said first microphone to the input to said second loudspeaker;
    said second model has a model input from the input to said second loudspeaker from the output of said first microphone, and a model output to the output of said second microphone to the input of said first speaker;
    said third model has a model input from the input to said second loudspeaker from the output of said first microphone, and a model output to the output of said first microphone to the input to said second loudspeaker;
    said fourth model has a model input from the input to said first loudspeaker from the output of said second microphone, and a model output to the output of said second microphone to the input to said first loudspeaker.

4. The invention according to claim 1 comprising:
    a first summer summing outputs of said first and third models and said first microphone, and supplying the resultant sum to said second loudspeaker;
    a second summer summing outputs of said second and fourth models and said second microphone, and supplying the resultant sum to said first loudspeaker.

5. The invention according to claim 4 comprising:

a third summer summing the output of said first summer and a first auxiliary noise signal, and supplying the resultant sum to said second loudspeaker;

a fourth summer summing the output of said second summer and a second auxiliary noise signal, and supplying the resultant sum to said first loudspeaker.

6. The invention according to claim 5 wherein:

said first auxiliary noise signal is random and uncorrelated relative to the speech of said first person;

said second auxiliary noise signal is random and uncorrelated relative to the speech of said second person and relative to said first auxiliary random noise signal.

7. The invention according to claim 6 wherein:

said first model has an error correlator having inputs from said first summer and said second auxiliary random noise signal;

said second model has an error correlator having inputs from said second summer and said first auxiliary random noise signal;

said third model has an error correlator having inputs from said first summer and said first auxiliary random noise signal;

said fourth model has an error correlator having inputs from said second summer and said second auxiliary random noise signal.

8. The invention according to claim 5 wherein:

said first model has a model input from the output of said fourth summer, a model output to an input to said first summer, and an error input from the output of said first summer;

said second model has a model input from the output of said third summer, a model output to an input to said second summer, and an error input from the output of said second summer;

said third model has a model input from the output of said third summer, a model output to an input to said first summer, and an error input from the output of said first summer;

said fourth model has a model input from the output of said fourth summer, a model output to an input to said second summer, and an error input from the output of said second summer.

9. The invention according to claim 4 comprising:

a third summer summing the output of said first summer and a desired audio signal for said second zone, and supplying the resultant sum to said second loudspeaker;

a fourth summer summing the output of said second summer and a desired audio signal for said first zone, and supplying the resultant sum to said first loudspeaker.

10. The invention according to claim 4 wherein:

said first model has a model input from the input to said first loudspeaker from the output of said second microphone, a model output to an input to said first summer, and an error input from the output of said first summer;

said second model has a model input from the input to said second loudspeaker from the output of said first microphone, a model output to an input to said second summer, and an error input from the output of said second summer;

said third model has a model input from the input to said second loudspeaker from the output of said first summer, a model output to an input to said first summer, and an error input from the output of said first summer;

said fourth model has a model input from the input to said first loudspeaker from the output of said second summer, a model output to an input to said second summer, and an error input from the output of said second summer.

11. The invention according to claim 10 comprising:

a third summer summing the output of said first summer and a desired audio signal for said second zone, and supplying the resultant sum to said second loudspeaker;

a fourth summer summing the output of said second summer and a desired audio signal for said first zone, and supplying the resultant sum to said first loudspeaker;

and wherein:

said error input of said first model is supplied from a node between said first and third summers;

said error input of said second model is supplied from a node between said second and fourth summers;

said error input of said third model is supplied from said node between said first and third summers;

said error input of said fourth model is supplied from said node between said second and fourth summers;

the model input of said first model is supplied from the output of said fourth summer;

the model input of said second model is supplied from the output of said third summer;

the model input of said third model is supplied from the output of said third summer;

the model input of said fourth model is supplied from the output of said fourth summer.

12. The invention according to claim 1 wherein at least one or more of said models is adaptive.

13. The invention according to claim 1 comprising:

a switch having open and closed states, and conducting the output of one of said microphones therethrough in said closed state;

a voice activity detector having an input from said output of said one microphone at a node between said one microphone and said switch;

an occupant sensor sensing the presence of a person at one of said acoustic zones;

an AND function having a first input from said voice activity detector, a second input from said occupant sensor, and an output to said switch to actuate the latter between said open and closed states.

14. The invention according to claim 1 wherein the input to said first model is supplied through a variable training signal circuit providing increasing training signal levels with increasing speech signal levels from said second microphone.

15. The invention according to claim 14 wherein said training signal circuit comprises:

a summer having a first input from said second microphone, a second input from said training signal, and an output to said first loudspeaker and to said first model;

a variable gain element supplying said training signal to said second input of said summer;

a gate sensing the speech signal level from said second microphone at a node between said second microphone and said first input of said summer, and controlling the gain of said variable gain element.

16. The invention according to claim 14 wherein said variable training signal circuit maintains said training signal levels below a level perceptible to a person at said first zone.

17. The invention according to claim 1 wherein:
the input to said first model is supplied through a first variable training signal circuit providing increasing training signal levels with increasing speech signal levels from said second microphone, said first training signal circuit comprising a first summer having a first input from said second microphone, a second input from a first training signal, and an output to said first loudspeaker and to said first model, a first variable gain element supplying said first training signal to said second input of said first summer, a first gate sensing the speech signal level from said second microphone at a first node between said second microphone and said first input of said first summer, and controlling the gain of said first variable gain element;
the input to said second model is supplied through a second variable training signal circuit providing increasing training signal levels with increasing speech signal levels from said first microphone, said second training signal circuit comprising a second summer having a first input from said first microphone, a second input from a second training signal, and an output to said second loudspeaker and to said second model, a second variable gain element supplying said second training signal to said second input of said second summer, a second gate sensing the speech signal level from said first microphone at a second node between said first microphone and said first input of said second summer, and controlling the gain of said second variable gain element.

18. The invention according to claim 1 comprising a tonal noise remover sensing periodic noise and removing same from the output of said first microphone to prevent broadcast thereof by said second loudspeaker.

19. The invention according to claim 18 wherein said tonal noise remover comprises a summer having a first input from said first microphone, a second input from a tone generator generating one or more tones in response to periodic noise, and an output to said second loudspeaker.

20. The invention according to claim 19 wherein the output of said tone generator is supplied through an adaptive filter model to said summer.

21. The invention according to claim 20 wherein said adaptive filter model has a model input from said tone generator, a model output supplying a correction signal to said second input to said summer, and an error input from said output of said summer.

22. The invention according to claim 21 wherein said tone generator receives a plurality of tach signals, and outputs a plurality of tone signals for each of said tach signals.

23. The invention according to claim 1 comprising:
a first tonal noise remover sensing periodic noise and removing same from the output of said first microphone to prevent broadcast thereof by said second loudspeaker, said first tonal noise sensor comprising a first summer having a first input from said first microphone, a second input from a first tone generator supplied through a first adaptive filter model, and an output to said second loudspeaker, said first tone generator generating one or more tones in response to periodic noise, said first adaptive filter model having a model input from said first tone generator, a model output supplying a correction signal to said second input to said first summer, and an error input from said output of said first summer;
a second tonal noise remover sensing periodic noise and removing same from the output of said second microphone to prevent broadcast thereof by said first loudspeaker, said second tonal noise sensor comprising a second summer having a first input from said second microphone, a second input from a second tone generator supplied through a second adaptive filter model, and an output to said first loudspeaker, said second tone generator generating one or more tones in response to periodic noise, said second adaptive filter model having a model input from said second tone generator, a model output supplying a correction signal to said second input to said second summer, and an error input from said output of said second summer.

24. The invention according to claim 23 comprising:
a third summer summing the outputs of said first and third models and said first summer, and supplying the resultant sum to said second loudspeaker;
a fourth summer summing the outputs of said second and fourth models and said second summer, and supplying the resultant sum to said first loudspeaker.

25. The invention according to claim 1 comprising a noise responsive high pass filter between said first microphone and said second loudspeaker and having a filter cutoff effective at elevated noise levels and reducing bandwidth and making more gain available, to improve intelligibility of speech of said first person transmitted from said first microphone to said second loudspeaker.

26. The invention according to claim 25 wherein said system is in a vehicle, and said high pass filter is vehicle speed sensitive,
such that at higher vehicle speeds and resulting higher noise levels, lower frequency speech content is blocked and higher frequency speech content is passed, the lower frequency speech content being otherwise masked at higher speeds by broadband vehicle and wind noise, so that the reduced bandwidth and the absence of the lower frequency speech content does not sacrifice the perceived quality of speech,
and such that at lower vehicle speeds and resulting lower noise levels, the cutoff frequency of said filter is lowered such that lower frequency speech content is passed, in addition to higher frequency speech content, to provide enriched low frequency performance, and overcome objections to a tinny sounding system.

27. The invention according to claim 25 comprising a summer having a first input from said first microphone, a second input from a training signal, and an output to said high pass filter, such that said training signal is variably filtered according to noise level.

28. The invention according to claim 25 comprising a summer having a first input from said high pass filter, a second input from a training signal, and an output to said second loudspeaker, such that said training signal is full bandwidth and not variably filtered according to noise level.

29. The invention according to claim 25 comprising:
a second noise responsive high pass filter between said second microphone and said first loudspeaker and having a filter cutoff effective at elevated noise levels and reducing bandwidth and making more gain available, to improve intelligibility of speech of said second person transmitted from said second microphone to said first loudspeaker;
a first summer summing the outputs of said first model and said first mentioned noise responsive high pass filter, and supplying the resultant sum to said second loudspeaker;

a second summer summing the outputs of said second model and said second noise responsive high pass filter, and supplying the resultant sum to said first loudspeaker.

30. The invention according to claim 1 comprising a feedback detector having an input from said first microphone, and an output controlling an adjustable notch filter filtering the output of said first microphone supplied to said second loudspeaker.

31. The invention according to claim 30 wherein:
said adjustable notch filter has an input from the output of said first microphone;
said feedback detector has an input from said first microphone at a node between the output of said first microphone and the input of said adjustable notch filter; and comprising a summer summing the outputs of said first and third models and said adjustable notch filter, and supplying the resultant sum to said second loudspeaker.

32. The invention according to claim 31 comprising a second feedback detector having an input from said second microphone, and an output controlling a second adjustable notch filter filtering the output of said second microphone supplied to said first loudspeaker, said second adjustable notch filter having an input from the output of said second microphone, said second feedback detector having an input from said second microphone at a second node between the output of said second microphone and the input of said second adjustable notch filter, and comprising a second summer summing the outputs of said second and fourth models and said second adjustable notch filter, and supplying the resultant sum to said first loudspeaker.

33. The invention according to claim 1 comprising a feedback tonal canceler removing tonal noise from the output of said first microphone to prevent broadcast thereof by said second loudspeaker.

34. The invention according to claim 33 wherein said feedback tonal canceler has an input from said first microphone, and an output summed with the output of said first microphone and supplied to said second loudspeaker.

35. The invention according to claim 33 wherein said feedback tonal canceler comprises a summer having a first input from said first microphone, a second input from a tone generator, and an output supplied to said second loudspeaker, and a feedback detector having an input from said first microphone, and an output to said tone generator.

36. The invention according to claim 35 wherein the output of said tone generator is supplied through an adaptive filter model to said second input to said summer.

37. The invention according to claim 36 wherein said adaptive filter model has a model input from said tone generator, a model output supplying a correction signal to said second input to said summer, and an error input from said output of said summer.

38. The invention according to claim 35 comprising a second summer summing the outputs of said first and third models and said first mentioned summer, and supplying the resultant sum to said second loudspeaker.

39. The invention according to claim 38 comprising a second feedback tonal canceler removing tonal noise from the output of said second microphone to prevent broadcast thereof by said first loudspeaker, said second feedback tonal canceler having an input from said second microphone, and an output summed with the output of said second microphone and supplied to said first loudspeaker, said second feedback tonal canceler comprising a third summer having a first input from said second microphone, a second input from a second tone generator, and an output supplied to said first loudspeaker, and a second feedback detector having an input from said second microphone, and an output to said second tone generator, and comprising a fourth summer summing the outputs of said second and fourth models and said third summer, and supplying the resultant sum to said first loudspeaker.

40. In an active acoustic attenuation system comprising:
a first zone subject to noise;
a first speaking location in said first zone such that a first person at said first speaking location is subject to noise;
a first loudspeaker introducing sound into said first zone at said first speaking location;
a first error microphone sensing noise and speech at said first speaking location;
a first model having an error input from said first microphone, and an output outputting a correction signal to said first loudspeaker to introduce canceling sound at said first speaking location to attenuate noise at said first speaking location;
a second zone subject to noise;
a second speaking location in said second zone such that a second person at said second speaking location is subject to noise;
a second loudspeaker introducing sound into said second zone at said second speaking location;
a second error microphone sensing noise and speech at said second speaking location;
a second model having an error input from said second error microphone, and an output outputting a correction signal to said second loudspeaker to introduce canceling sound at said second speaking location to attenuate noise at said second speaking location;
a third model canceling the speech of said second person in the output of said first microphone otherwise present due to electrical transmission from said second microphone to said first loudspeaker and broadcast by said first loudspeaker to said first microphone, the cancellation of the speech of said second person in the output of said first microphone preventing rebroadcast thereof by said second loudspeaker;
a fourth model canceling the speech of said first person in the output of said second microphone otherwise present due to electrical transmission from said first microphone to said second loudspeaker and broadcast by said second loudspeaker to said second microphone, the cancellation of the speech of said first person in the output of said second microphone preventing rebroadcast thereof by said first loudspeaker;
the improvement comprising:
a fifth model canceling the speech of said first person in the output of said first microphone otherwise present due to acoustic transmission from said second loudspeaker in said second zone to said first microphone in said first zone;
a sixth model canceling the speech of said second person in the output of said second microphone otherwise present due to acoustic transmission from said first loudspeaker in said first zone to said second microphone in said second zone.

41. The invention according to claim 40 comprising:
a seventh model having an output outputting a correction signal summed at a first summer with the output of said first microphone to electrically cancel noise from said first zone in the output of said first microphone, and having an error input from the output of said first summer;

an eighth model having a model output outputting a correction signal summed at a second summer with the output of said second microphone to electrically cancel noise from said second zone in the output of said second microphone, and having an error input from the output of said second summer.

42. The invention according to claim 40 comprising:

a first summer summing the outputs of said first model and said second microphone, and supplying the resultant sum to said first loudspeaker;

a second summer summing the outputs of said second model and said first microphone, and supplying the resultant sum to said second loudspeaker;

a third summer summing the outputs of said third and fifth models and said first microphone, and supplying the resultant sum to said second loudspeaker;

a fourth summer summing the outputs of said fourth and sixth models and said second microphone, and supplying the resultant sum to said first loudspeaker;

the output of said fourth summer being supplied to an input of said first summer;

the output of said third summer being supplied to an input of said second summer;

said third model having a model input from the output of said fourth summer, a model output to an input to said third summer, and an error input from the output of said third summer;

said fourth model having a model input from the output of said third summer, a model output to an input to said fourth summer, and an error input from the output of said fourth summer;

said fifth model having a model input from the output of said third summer, a model output to an input to said third summer, and an error input from the output of said third summer;

said sixth model having a model input from the output of said fourth summer, a model output to an input to said fourth summer, and an error input from the output of said fourth summer.

43. The invention according to claim 40 comprising:

a seventh model electrically canceling noise from said first zone in the output of said first microphone;

an eighth model electrically canceling noise from said second zone in the output of said second microphone;

a fifth summer summing the outputs of said seventh model and said first microphone, and supplying the resultant sum to an input to said third summer and to an error input of said seventh model;

a sixth summer summing the outputs of said eighth model and said second microphone, and supplying the resultant sum to an input to said fourth summer and an error input to said eighth model.

44. The invention according to claim 42 comprising:

a fifth summer summing the outputs of said third summer and a first auxiliary noise signal, and supplying the resultant sum to said inputs to said fourth and fifth models and said second summer;

a sixth summer summing the outputs of said fourth summer and a second auxiliary noise signal, and supplying the resultant sum to said inputs to said third and sixth models and said first summer.

45. The invention according to claim 44 wherein:

said first auxiliary noise signal is random and uncorrelated relative to said noise in said first zone, the speech of said first person, said noise in said second zone, and the speech of said second person;

said second auxiliary noise signal is random and uncorrelated relative to said noise in said first zone, the speech of said first person, said noise in said second zone, the speech of said second person, and said first random auxiliary noise signal.

46. The invention according to claim 45 wherein said third model has an error correlator having inputs from said third summer and said second random auxiliary noise signal;

said fourth model has an error correlator having inputs from said fourth summer and said first random auxiliary noise signal;

said fifth model has an error correlator having inputs from said third summer and said first random auxiliary noise signal;

said sixth model has an error correlator having inputs from said fourth summer and said second random auxiliary noise signal.

47. The invention according to claim 40 wherein at least one or more of said models is adaptive.

48. A communication system comprising:

a first acoustic zone;

a second acoustic zone;

a first microphone at said first zone;

a first loudspeaker at said first zone;

a second microphone at said second zone and having an output supplied to said first loudspeaker such that a first person at said first zone can hear the speech of a second person at said second zone as transmitted by said second microphone and said first loudspeaker;

a second loudspeaker at said second zone and having an input supplied from said first microphone such that said second person at said second zone can hear the speech of said first person at said first zone as transmitted by said first microphone and said second loudspeaker;

a switch having open and closed states, and conducting the output of one of said microphones therethrough in said closed state;

a voice activity detector having an input from said output of said one microphone at a node between said one microphone and said switch;

an occupant sensor sensing the presence of a person at one of said acoustic zones;

an AND function having a first input from said voice activity detector, a second input from said occupant sensor, and an output to said switch to actuate the latter between said open and closed states.

49. A communication system comprising:

a first acoustic zone;

a second acoustic zone;

a first microphone at said first zone;

a first loudspeaker at said first zone;

a second microphone at said second zone and having an output supplied to said first loudspeaker such that a first person at said first zone can hear the speech of a second person at said second zone as transmitted by said second microphone and said first loudspeaker;

a second loudspeaker at said second zone and having an input supplied from said first microphone such that said second person at said second zone can hear the speech of said first person at said first zone as transmitted by said first microphone and said second loudspeaker;

a first model canceling the speech of said second person in the output of said first microphone otherwise present due to electrical transmission from said second microphone to said first loudspeaker and broadcast by said first loudspeaker to said first microphone, the cancellation of the speech of said second person in the output of said first microphone preventing rebroadcast thereof by said second loudspeaker;

a second model canceling the speech of said first person in the output of said second microphone otherwise present due to electrical transmission from said first microphone to said second loudspeaker and broadcast by said second loudspeaker to said second microphone, the cancellation of the speech of said first person in the output of said second microphone preventing rebroadcast thereof by said first loudspeaker;

a variable training signal circuit supplying an input to said first model and providing increasing training signal levels with increasing speech signal levels from said second microphone.

50. The invention according to claim 49 wherein said training signal circuit comprises:

a summer having a first input from said second microphone, a second input from said training signal, and an output to said first loudspeaker and to said first model;

a variable gain element supplying said training signal to said second input of said summer;

a gate sensing the speech signal level from said second microphone at a node between said second microphone and said first input of said summer, and controlling the gain of said variable gain element.

51. The invention according to claim 50 comprising in combination a second variable training signal circuit supplying an input to said second model and providing increasing training signal levels with increasing speech levels from said first microphone, said second training signal circuit comprising a second summer having a first input from said first microphone, a second input from a second training signal, and an output to said second loudspeaker and to said second model, a second variable gain element supplying said second training signal to said second input of said second summer, a second gate sensing the speech level from said first microphone at a second node between said first microphone and said first input of said second summer, and controlling the gain of said second variable gain element, wherein said training signal circuits maintain training signal levels of said training signals below levels perceptible to persons at said first and second zones.

52. A communication system comprising:

a first acoustic zone;

a second acoustic zone;

a first microphone at said first zone;

a first loudspeaker at said first zone;

a second microphone at said second zone and having an output supplied to said first loudspeaker such that a first person at said first zone can hear the speech of a second person at said second zone as transmitted by said second microphone and said first loudspeaker;

a second loudspeaker at said second zone and having an input supplied from said first microphone such that said second person at said second zone can hear the speech of said first person at said first zone as transmitted by said first microphone and said second loudspeaker;

a first model canceling the speech of said second person in the output of said first microphone otherwise present due to electrical transmission from said second microphone to said first loudspeaker and broadcast by said first loudspeaker to said first microphone, the cancellation of the speech of said second person in the output of said first microphone preventing rebroadcast thereof by said second loudspeaker;

a second model canceling the speech of said first person in the output of said second microphone otherwise present due to electrical transmission from said first microphone to said second loudspeaker and broadcast by said second loudspeaker to said second microphone, the cancellation of the speech of said first person in the output of said second microphone preventing rebroadcast thereof by said first loudspeaker;

a first summer having a first input from said first microphone, a second input from a tone generator generating one or more tones in response to periodic noise, and an output to a second summer.

53. The invention according to claim 52 wherein the output of said tone generator is supplied through an adaptive filter model to said second input to said first summer.

54. The invention according to claim 53 wherein said adaptive filter model has a model input from said tone generator, a model output supplying a correction signal to said second input to said first summer, and an error input from said output of said first summer.

55. The invention according to claim 54 wherein said second summer has a first input from the output of said first model, a second input from the output of said first summer, a third input from the output of a third model and an output supplied to said second loudspeaker.

56. The invention according to claim 52 comprising in combination:

a first tonal noise remover sensing periodic noise and removing same from the output of said first microphone to prevent broadcast thereof by said second loudspeaker, said first tonal noise remover comprising said first summer having said first input from said first microphone, said second input from said tone generator supplied through said adaptive filter model, and said output to said second summer;

a second tonal noise remover sensing periodic noise and removing same from the output of said second microphone to prevent broadcast thereof by said first loudspeaker, said second tonal noise remover comprising a third summer having a first input from said second microphone, a second input from a second tone generator supplied through a second adaptive filter model, and an output to a fourth summer, said second tone generator generating one or more tones in response to periodic noise, said second adaptive filter model having a model input from said second tone generator, a model output supplying a correction signal to said second input to said third summer, and an error input from said output of said third summer.

57. A communication system comprising:

a first acoustic zone;

a second acoustic zone;

a first microphone at said first zone;

a first loudspeaker at said first zone;

a second microphone at said second zone and having an output supplied to said first loudspeaker such that a first person at said first zone can hear the speech of a second person at said second zone as transmitted by said second microphone and said first loudspeaker;

a second loudspeaker at said second zone and having an input supplied from said first microphone such that said second person at said second zone can hear the speech of said first person at said first zone as transmitted by said first microphone and said second loudspeaker;

a first model canceling the speech of said second person in the output of said first microphone otherwise present due to electrical transmission from said second microphone to said first loudspeaker and broadcast by said first loudspeaker to said first microphone, the cancellation of the speech of said second person in the output of said first microphone preventing rebroadcast thereof by said second loudspeaker;

a second model canceling the speech of said first person in the output of said second microphone otherwise present due to electrical transmission from said first microphone to said second loudspeaker and broadcast by said second loudspeaker to said second microphone, the cancellation of the speech of said first person in the output of said second microphone preventing rebroadcast thereof by said first loudspeaker;

a noise responsive high pass filter between said first microphone and said second loudspeaker and having a filter cutoff effective at elevated noise levels and reducing bandwidth and making more gain available, to improve intelligibility of speech of said first person transmitted from said first microphone to said second loudspeaker.

58. The invention according to claim 57 wherein said system is in a vehicle, and said high pass filter is vehicle speed sensitive, such that at higher vehicle speeds and resulting higher noise levels, lower frequency speech content is blocked and higher frequency speech content is passed, the lower frequency speech content being otherwise masked at higher speeds by broadband vehicle and wind noise, and such that at lower vehicle speeds and resulting lower noise levels, the cutoff frequency of said filter is lowered such that lower frequency speech content is passed, in addition to higher frequency speech content, to overcome objections to a tinny sounding system.

59. The invention according to claim 57 comprising a summer having a first input from said first microphone, a second input from a training signal, and an output to said high pass filter, such that said training signal is variably filtered according to noise level.

60. The invention according to claim 57 comprising a summer having a first input from said high pass filter, a second input from a training signal, and an output to said second loudspeaker, such that said training signal is full bandwidth and not variably filtered according to noise level.

61. The invention according to claim 57 comprising:

a second noise responsive high pass filter between said second microphone and said first loudspeaker and having a filter cutoff reducing bandwidth and making more gain available, to improve intelligibility of speech of said second person transmitted from said second microphone to said first loudspeaker;

a first summer summing the outputs of said first model and said first mentioned noise responsive high pass filter, and supplying the resultant sum to said second loudspeaker;

a second summer summing the outputs of said second model and said second noise responsive high pass filter, and supplying the resultant sum to said first loudspeaker.

62. A communication system comprising:

a first acoustic zone;

a second acoustic zone;

a first microphone at said first zone;

a first loudspeaker at said first zone;

a second microphone at said second zone and having an output supplied to said first loudspeaker such that a first person at said first zone can hear the speech of a second person at said second zone as transmitted by said second microphone and said first loudspeaker;

a second loudspeaker at said second zone and having an input supplied from said first microphone such that said second person at said second zone can hear the speech of said first person at said first zone as transmitted by said first microphone and said second loudspeaker;

a first model canceling the speech of said second person in the output of said first microphone otherwise present due to electrical transmission from said second microphone to said first loudspeaker and broadcast by said first loudspeaker to said first microphone, the cancellation of the speech of said second person in the output of said first microphone preventing rebroadcast thereof by said second loudspeaker;

a second model canceling the speech of said first person in the output of said second microphone otherwise present due to electrical transmission from said first microphone to said second loudspeaker and broadcast by said second loudspeaker to said second microphone, the cancellation of the speech of said first person in the output of said second microphone preventing rebroadcast thereof by said first loudspeaker;

a feedback detector having an input from said first microphone, and an output controlling an adjustable notch filter filtering the output of said first microphone supplied to said second loudspeaker.

63. The invention according to claim 62 wherein:

said adjustable notch filter has an input from the output of said first microphone;

said feedback detector has an input from said first microphone at a node between the output of said first microphone and the input of said adjustable notch filter;

and comprising a summer having a first input from the output of said first model, a second input from the output of said adjustable notch filter, a third input from the output of a third model, and an output supplied to said second loudspeaker.

64. The invention according to claim 63 comprising a second feedback detector having an input from said second microphone, and an output controlling a second adjustable notch filter filtering the output of said second microphone supplied to said first loudspeaker, said second adjustable notch filter having an input from the output of said second microphone, said second feedback detector having an input from said second microphone at a second node between the output of said second microphone and the input of said second adjustable notch filter, and comprising a second summer having a first input from the output of said second model, a second input from the output of said second adjustable notch filter, a third input from the output of a fourth model, and an output supplied to said first loudspeaker.

65. A communication system comprising:
a first acoustic zone;
a second acoustic zone;
a first microphone at said first zone;
a first loudspeaker at said first zone;
a second microphone at said second zone and having an output supplied to said first loudspeaker such that a first person at said first zone can hear the speech of a second person at said second zone as transmitted by said second microphone and said first loudspeaker;
a second loudspeaker at said second zone and having an input supplied from said first microphone such that said second person at said second zone can hear the speech of said first person at said first zone as transmitted by said first microphone and said second loudspeaker;
a first model canceling the speech of said second person in the output of said first microphone otherwise present due to electrical transmission from said second microphone to said first loudspeaker and broadcast by said first loudspeaker to said first microphone, the cancellation of the speech of said second person in the output of said first microphone preventing rebroadcast thereof by said second loudspeaker;
a second model canceling the speech of said first person in the output of said second microphone otherwise present due to electrical transmission from said first microphone to said second loudspeaker and broadcast by said second loudspeaker to said second microphone, the cancellation of the speech of said first person in the output of said second microphone preventing rebroadcast thereof by said first loudspeaker;
a feedback tonal canceler removing tonal noise from the output of said first microphone to prevent broadcast thereof by said second loudspeaker.

66. The invention according to claim 65 wherein said feedback tonal canceler has an input from said first microphone, and an output summed at a first summer with the output of said first microphone and supplied to a second summer.

67. The invention according to claim 66 wherein said feedback tonal canceler comprises said first summer having a first input from said first microphone, a second input from a tone generator, and an output supplied to said second summer, and a feedback detector having an input from said first microphone, and an output to said tone generator.

68. The invention according to claim 67 wherein the output of said tone generator is supplied through an adaptive filter model to said second input to said first summer.

69. The invention according to claim 68 wherein said adaptive filter model has a model input from said tone generator, a model output outputting a correction signal to said second input to said first summer, and an error input from said output of said first summer.

70. The invention according to claim 67 wherein said second summer has a first input from the output of said first model, a second input from the output of said first summer, a third input from the output of a third model and an output supplied to said second loudspeaker.

71. The invention according to claim 70 comprising a second feedback tonal canceler removing tonal noise from the output of said second microphone to prevent broadcast thereof by said first loudspeaker, said second feedback tonal canceler having an input from said second microphone, and an output summed at a third summer with the output of said second microphone and supplied to said first loudspeaker, said second feedback tonal canceler comprising said third summer having a first input from said second microphone, a second input from a second tone generator, and an output supplied to a fourth summer, and a second feedback detector having an input from said second microphone, and an output to said second tone generator, and comprising said fourth summer having a first input from the output of said second model, a second input from the output of said third summer, and an output supplied to said first loudspeaker.

72. The invention according to claim 71 wherein the output of said second tone generator is supplied through a second adaptive filter model to said second input to said third summer, said second adaptive filter model having a model input from said second tone generator, a model output supplying a correction signal to said second input to said third summer, and an error input from said output of said third summer.

73. A communication system comprising first and second acoustic zones, a microphone at said first zone, a loudspeaker at said second zone and having an input supplied from said microphone such that a person at said second zone can hear the speech of a person at said first zone, a switch having open and closed states and conducting the output of said microphone therethrough in said closed state, a voice activity detector having an input from said output of said microphone at a node between said microphone and said switch, an occupant sensor sensing the presence of a person at said first zone, an AND function having a first input from said voice activity detector, a second input from said occupant sensor, and an output to said switch to actuate the latter between said open and closed states.

74. A communication system comprising first and second acoustic zones, a microphone at said first zone, a loudspeaker at said second zone and having an input supplied from said microphone such that a person at said second zone can hear the speech of a person at said first zone, a tonal noise remover sensing periodic noise and removing same from the output of said microphone to prevent broadcast thereof by said loudspeaker.

75. The invention according to claim 74 wherein said tonal noise remover comprises a summer having a first input from said microphone, a second input from a tone generator generating one or more tones in response to said periodic noise, and an output to said loudspeaker.

76. The invention according to claim 75 wherein the output of said tone generator is supplied through an adaptive filter model to said summer.

77. The invention according to claim 76 wherein said adaptive filter model has a model input from said tone generator, a model output supplying a correction signal to said second input to said summer, and an error input from said output of said summer.

78. The invention according to claim 77 wherein said tone generator receives a plurality of tach signals, and outputs a plurality of tone signals for each of said tach signals.

79. A communication system comprising first and second acoustic zones, a microphone at said first zone, a loudspeaker at said second zone and having an input supplied from said microphone such that a person at said second zone can hear the speech of a person at said first zone, a noise responsive highpass filter between said microphone and said loudspeaker and having a filter cutoff effective at elevated noise levels and reducing bandwidth and making more gain available, to improve intelligibility of speech of said person at said first zone transmitted from said microphone to said loudspeaker.

80. A communication system comprising first and second acoustic zones, a microphone at said first zone, a loudspeaker at said second zone and having an input supplied from said microphone such that a person at said second zone can hear the speech of a person at said first zone, a switch having open and closed states and conducting the output of said microphone therethrough in said closed state, a voice activity detector having an input from said output of said microphone at a node between said microphone and said switch, a noise responsive highpass filter between said microphone and said loudspeaker and having a filter cutoff reducing bandwidth and making more gain available, to improve intelligibility of speech of said person at said first zone transmitted from said microphone to said loudspeaker when said switch is in said closed state.

81. A vehicle communication system comprising first and second acoustic zones in the vehicle, a first microphone at said first zone, a loudspeaker at said second zone and having an input supplied from said microphone such that an occupant at said second zone can hear the speech of an occupant at said first zone, a vehicle speed sensitive highpass filter between said microphone and said loudspeaker and having a filter cutoff reducing bandwidth and making more gain available, to improve intelligibility of speech of said occupant at said first zone transmitted from said microphone to said loudspeaker, such that at higher vehicle speeds, lower frequency speech content is blocked and higher frequency speech content is passed, the lower frequency speech content being otherwise masked at higher speeds by broadband vehicle and wind noise, and such that at lower vehicle speeds, the cutoff frequency of said filter is lowered such that lower frequency speech content is passed, in addition to higher frequency speech content, to overcome objections to a tinny sounding system in said vehicle.

* * * * *